(12) United States Patent
Fuchs et al.

(10) Patent No.: US 9,405,513 B2
(45) Date of Patent: Aug. 2, 2016

(54) SYSTEMS AND METHODS FOR GRAPHICALLY DEVELOPING RULES FOR TRANSFORMING MODELS BETWEEN DESCRIPTION NOTATIONS

(75) Inventors: Denitza Fuchs, Saarbruecken (DE); Richard Martens, Saarbruecken (DE)

(73) Assignee: Software AG, Darmstadt (DE)

( * ) Notice: Subject to any disclaimer, the term of this patent is extended or adjusted under 35 U.S.C. 154(b) by 1537 days.

(21) Appl. No.: 12/318,011

(22) Filed: Dec. 19, 2008

(65) Prior Publication Data
US 2009/0265684 A1 Oct. 22, 2009

Related U.S. Application Data

(60) Provisional application No. 61/071,255, filed on Apr. 18, 2008.

(51) Int. Cl.
*G06F 9/44* (2006.01)
*G06Q 10/06* (2012.01)
*G06F 17/22* (2006.01)

(52) U.S. Cl.
CPC .. *G06F 8/10* (2013.01); *G06F 8/34* (2013.01); *G06F 8/35* (2013.01); *G06F 17/2264* (2013.01); *G06Q 10/06* (2013.01); *G06Q 10/067* (2013.01); *G06Q 10/0633* (2013.01); *G06Q 10/06375* (2013.01)

(58) Field of Classification Search
CPC ............... G06F 8/10; G06F 8/34; G06F 8/35; G06F 17/2264; G06Q 10/067
USPC ................................................ 715/852, 763
See application file for complete search history.

(56) References Cited

U.S. PATENT DOCUMENTS

| | | | | |
|---|---|---|---|---|
| 6,973,638 B1* | 12/2005 | Gangopadhyay et al. | ..... | 717/104 |
| 7,185,016 B1* | 2/2007 | Rasmussen | ............ | G06Q 10/10 |
| 7,206,751 B2* | 4/2007 | Hack et al. | ................... | 705/7.11 |
| 7,222,302 B2* | 5/2007 | Hauser et al. | ................. | 715/734 |
| 7,280,973 B1* | 10/2007 | Hack et al. | ................... | 705/7.11 |
| 7,370,315 B1* | 5/2008 | Lovell et al. | .................. | 717/100 |
| 7,680,800 B2* | 3/2010 | Claussen et al. | ............ | 709/246 |
| 7,703,071 B2* | 4/2010 | Kuester et al. | ................ | 717/104 |

(Continued)

OTHER PUBLICATIONS

Ask Search, http://www.ask.com/web?q=transformation+strategies+between+block+oriented&qsrc=0 . . . .*

(Continued)

*Primary Examiner* — Jeffrey A Gaffin
*Assistant Examiner* — John M Heffington
(74) *Attorney, Agent, or Firm* — Finnegan, Henderson, Farabow, Garrett & Dunner, LLP

(57) ABSTRACT

Systems and methods are graphically developing rules for transforming models between different description notations. The transformation rules may be used to transform a model in a source description notation to a new model in a target description notation. In one embodiment, graphical constructs are provided including symbols in the source description notation and the target description notation. The constructs for the source description notation are arranged in a source pattern, and the constructs for the target description notation are arranged in a target pattern, according to user instructions. The source and target patterns are sent to a transformation engine and subsequently accessed to provide at least one transformation rule utilized by the transformation engine.

21 Claims, 16 Drawing Sheets

(56) References Cited

U.S. PATENT DOCUMENTS

| | | | |
|---|---|---|---|
| 7,921,409 B2 * | 4/2011 | Shepard et al. | 717/108 |
| 7,949,619 B2 * | 5/2011 | Narayanaswamy et al. | 706/12 |
| 8,250,234 B2 * | 8/2012 | Allen et al. | 709/236 |
| 8,281,324 B2 * | 10/2012 | Kaehler et al. | 719/328 |
| 8,423,514 B2 * | 4/2013 | Goldenberg et al. | 707/673 |
| 8,484,255 B2 * | 7/2013 | Amulu et al. | 707/809 |
| 8,484,561 B1 * | 7/2013 | Lemonik et al. | 715/255 |
| 8,671,222 B2 * | 3/2014 | Gass et al. | 709/246 |
| 8,676,627 B2 * | 3/2014 | Gerth et al. | 705/7.27 |
| 8,719,317 B1 * | 5/2014 | Crain | 707/813 |
| 8,756,259 B1 * | 6/2014 | Crain | 707/813 |
| 8,948,997 B2 * | 2/2015 | Nakada | 701/102 |
| 8,949,291 B2 * | 2/2015 | Amulu et al. | 707/809 |
| 9,020,944 B2 * | 4/2015 | Srivastava et al. | 707/737 |
| 2002/0138820 A1 * | 9/2002 | Daly | G06F 9/542 717/126 |
| 2003/0120651 A1 * | 6/2003 | Bernstein | G06F 17/30569 |
| 2003/0121001 A1 * | 6/2003 | Jeannette | G06F 17/227 715/234 |
| 2003/0149934 A1 * | 8/2003 | Worden | 715/513 |
| 2003/0154271 A1 * | 8/2003 | Baldwin et al. | 709/223 |
| 2003/0187676 A1 * | 10/2003 | Hack et al. | 705/1 |
| 2004/0181538 A1 * | 9/2004 | Lo | G06F 17/30592 |
| 2004/0230681 A1 * | 11/2004 | Strassner et al. | 709/226 |
| 2005/0027582 A1 * | 2/2005 | Chereau | G06Q 10/0631 705/7.12 |
| 2005/0120051 A1 * | 6/2005 | Danner et al. | 707/104.1 |
| 2005/0120332 A1 * | 6/2005 | Martin et al. | 717/105 |
| 2005/0131805 A1 * | 6/2005 | Bross | 705/39 |
| 2005/0216917 A1 * | 9/2005 | Krishnaswamy et al. | 719/315 |
| 2005/0289504 A1 * | 12/2005 | Buchmann et al. | 717/102 |
| 2006/0026506 A1 * | 2/2006 | Kristiansen et al. | 715/517 |
| 2006/0026522 A1 * | 2/2006 | Bendsen | G06F 8/34 715/705 |
| 2006/0101423 A1 * | 5/2006 | Aharoni et al. | 717/136 |
| 2006/0106824 A1 * | 5/2006 | Stuhec | 707/100 |
| 2006/0224425 A1 * | 10/2006 | Homann et al. | 705/7 |
| 2006/0293941 A1 * | 12/2006 | Ivanov et al. | 705/8 |
| 2007/0005618 A1 * | 1/2007 | Ivanov et al. | 707/100 |
| 2007/0038501 A1 * | 2/2007 | Lee et al. | 705/10 |
| 2007/0038651 A1 * | 2/2007 | Bernstein | G06F 17/30587 |
| 2007/0055932 A1 * | 3/2007 | Glein | G06F 9/4443 715/209 |
| 2007/0073763 A1 * | 3/2007 | Betts | G06F 8/35 |
| 2007/0094199 A1 * | 4/2007 | Deshpande et al. | 706/47 |
| 2007/0112878 A1 * | 5/2007 | Bennett | G06F 17/30377 |
| 2007/0118551 A1 * | 5/2007 | Akkiraju et al. | 707/102 |
| 2007/0174763 A1 * | 7/2007 | Chang | G06F 17/3092 715/234 |
| 2007/0174795 A1 * | 7/2007 | Lavagno et al. | 716/3 |
| 2007/0179821 A1 * | 8/2007 | Poetsch et al. | 705/7 |
| 2007/0245297 A1 * | 10/2007 | Kuester et al. | 717/104 |
| 2007/0261040 A1 * | 11/2007 | Ogilvie | G06F 8/34 717/146 |
| 2007/0266377 A1 * | 11/2007 | Ivanov | 717/136 |
| 2008/0015911 A1 * | 1/2008 | Wang et al. | 705/7 |
| 2008/0040099 A1 * | 2/2008 | Wu | G06F 17/275 704/9 |
| 2008/0046864 A1 * | 2/2008 | Bai | G06F 8/35 717/105 |
| 2008/0077621 A1 * | 3/2008 | Borgsmidt | G06F 17/30592 |
| 2008/0126027 A1 * | 5/2008 | Altenhofen | G06F 8/10 703/2 |
| 2008/0189323 A1 * | 8/2008 | Chang | G06F 17/3092 |
| 2008/0222189 A1 * | 9/2008 | Ovanesyan | G06Q 10/06 |
| 2008/0229275 A1 * | 9/2008 | Weber | 717/104 |
| 2008/0255997 A1 * | 10/2008 | Bluhm et al. | 705/80 |
| 2008/0263510 A1 * | 10/2008 | Nerome et al. | 717/104 |
| 2009/0002764 A1 * | 1/2009 | Atkins | G06T 11/60 358/1.18 |
| 2009/0006150 A1 * | 1/2009 | Prigge et al. | 705/7 |
| 2009/0007056 A1 * | 1/2009 | Prigge et al. | 717/104 |
| 2009/0024558 A1 * | 1/2009 | Brethauer et al. | 707/1 |
| 2009/0024660 A1 * | 1/2009 | Borgsmidt | G06F 17/30592 |
| 2009/0024965 A1 * | 1/2009 | Zhdankin et al. | 715/863 |
| 2009/0083297 A1 * | 3/2009 | Pohl | G06F 17/227 |
| 2009/0113380 A1 * | 4/2009 | Ploesser | G06F 8/20 717/104 |
| 2009/0138425 A1 * | 5/2009 | Narayanaswamy et al. | 706/48 |
| 2009/0150125 A1 * | 6/2009 | Elaasar | G06F 8/38 703/2 |
| 2009/0150854 A1 * | 6/2009 | Elaasar | G06F 8/35 717/104 |
| 2009/0150855 A1 * | 6/2009 | Elaasar | G06F 8/10 717/104 |
| 2009/0164985 A1 * | 6/2009 | Balko | G06Q 10/06 717/162 |
| 2009/0172632 A1 * | 7/2009 | Kashai et al. | 717/104 |
| 2009/0198481 A1 * | 8/2009 | Narayanaswamy et al. | 703/13 |
| 2009/0198532 A1 * | 8/2009 | Litoiu et al. | 705/7 |
| 2009/0198533 A1 * | 8/2009 | Narayanaswamy et al. | 705/7 |
| 2009/0198639 A1 * | 8/2009 | Narayanaswamy et al. | 706/48 |
| 2009/0259683 A1 * | 10/2009 | Murty | 707/103 R |
| 2009/0276695 A1 * | 11/2009 | Hodges et al. | 715/249 |
| 2010/0145746 A1 * | 6/2010 | Gerth et al. | 705/7 |
| 2010/0199257 A1 * | 8/2010 | Biggerstaff | 717/104 |
| 2011/0078211 A1 * | 3/2011 | Gass et al. | 707/803 |
| 2011/0145707 A1 * | 6/2011 | Gschwind et al. | 715/708 |
| 2012/0030573 A1 * | 2/2012 | Balko et al. | 715/735 |
| 2012/0047155 A1 * | 2/2012 | Jia et al. | 707/756 |
| 2012/0089583 A1 * | 4/2012 | Haudenschild et al. | 707/706 |
| 2012/0179663 A1 * | 7/2012 | Haudenschild et al. | 707/706 |
| 2012/0277975 A1 * | 11/2012 | Nakada | 701/102 |
| 2012/0278062 A1 * | 11/2012 | Cheng | 704/3 |
| 2012/0316841 A1 * | 12/2012 | Rameau et al. | 703/1 |
| 2014/0297670 A1 * | 10/2014 | Arshad et al. | 707/756 |

OTHER PUBLICATIONS

Transformation Strategies between Block-Oriented and Graph-Oriented Process Modelling Languages, Mendling, 2006.*
Ask-Search-q=transformation+strategies+between+bloc Mar. 24, 2012.*
Bing search q=business+model+source+target+trans Mar. 17, 2016.*
Business process ontologies frequently asked questions Dieter Jens Jul. 2003.*
Methodology-for-mapping-business-process-into-execution-langauge Jan. 1, 2011.*
Towards-transformations-from-bpmn-to-heterogeneous-systems, no date given.*
Transformation-of-yepc-business-process-models-to-yawl-date Apr. 2006.*
Transformation-strategies-between-block-oriented-and-graph-oriented-process-modelling-languages 2005.*
Andrews et al., "Business Process Execution Language for Web Services," May 5, 2003, Version 1.1(136 pages).
Christensen et al., "Web Services Description Language (WSDL) 1.1," Mar. 15, 2001, available at http://www.w3.org/TR/wsdl (31 pages).
Bray et al., "Namespaces in XML," 1999, Jan. 14, 2999, available at http://www.w3.org/TR/1999/REC-xml-names-19990114/ (11 pages).
Thompson et al., "XML Schema Part 1: Structures Second Edition," Oct. 28, 2004, available at http://www.w3.org/TR/xmlschema-1/ (91 pages).
Van Der Aalst et al., "Workflow Patterns," *Distributed and Parallel Databases*, Jul. 2003, vol. 14, No. 1, Springer Netherlands, The Netherlands (70 pages).
Wohed et al., "Pattern Based Analysis of BPEL4WS," Apr. 2002, QUT Technical Report FIT-TR-2002-04, Queensland University of Technology, Brisbane, Australia (20 pages).
Mendling et al., "Towards Workflow Pattern Support of Event-Driven Process Chains (EPC)," *Proceedings of the 2nd GI-Workshop XML4BPM*, 2005, Karlsruhe, Germany (15 pages).
Nantes et al., "ATL: Atlas Transformation Language," ATL Starter's Guide, Version 0.1, Dec. 2005, pp. 1-20.
Nantes et al., "ATL: Atlas Transformation Language," ATL User Manual, Version 0.7, Feb. 2006, pp. 1-88.

(56) References Cited

OTHER PUBLICATIONS

QVT, Retrieved on May 29, 2009, from http://en.wikipedia.org/wiki/QVT (3 pages).

Meta Object Facility (MOF) 2.0 Query/View/Transformation Specification, Retrieved on May 11, 2001, from http://www.omg.org/docs/ptc/05-11-01.pdf, pp. 1-190.

Murzek et al., "Structural patterns for the Transformation of Business Process Models," Accepted at the International Workshop on Models for Enterprise Computing (IWMEC 2006) at the 10$^{th}$ IEEE International EDOC Conference (EDOC 2006) "The Enterprise Computing Conference," Hong Kong, Oct. 2006 (10 pages).

Murzek et al., "Business Process Model Transformation Issues—The top 7 adversaries encountered at defining model transformations," Conference Paper at the 9$^{th}$ International Conference on Enterprise Information Systems ICEIS 2007, Funchal, Madeira-Portugal, Jun. 2007 (8 pages).

Murzek et al., "Model Transformation in Practice Using the BOC Model Transformer," Paper for the Workshop "Model Transformation in Practice" at MoDELS 2005, Montego Bay, Jamaica, Oct. 2005 (31 pages).

Murzek et al., "Defining Model Transformations for Business Process Models Graphically," Position Paper for Workshop "Enterprise Modeling and Ontology: Ingredients for interoperability" at PAKM 2004, Vienna, VA, Dec. 2004 (8 pages).

Stein et al., "EPK nach BPEL Transformation als Voraussetzung für praktische Umsetzung einer SOA," 2007 (6 pages) and English abstract (1 page).

\* cited by examiner

SYSTEMS AND METHODS FOR GRAPHICALLY DEVELOPING RULES FOR TRANSFORMING MODELS BETWEEN DESCRIPTION NOTATIONS

CROSS REFERENCE TO RELATED APPLICATION(S)

This application claims the benefit of priority from U.S. Provisional Application No. 61/071,255, entitled "SYSTEMS AND METHODS FOR MODEL TRANSFORMATION," filed Apr. 18, 2008, the disclosure of which is expressly incorporated herein by reference to its entirety.

BACKGROUND

I. Technical Field

The present invention generally relates to the field of data processing and to software-based tools for modeling and executing processes. More particularly, and without limitation, the invention relates to systems and methods for developing rules for transforming models between description notations. Using the transformation rules, a model may be provided in a source description and translated into a target description notation.

II. Background Information

Business processes are the driving factors of a successful company. On the operational level, business processes are a description of consecutive functions or activities in order to create added value. Business processes may relate to various activities of a company, such as the handling of purchase orders or product returns. Business processes can also be used to describe the interaction between various types of business information, such as the organization of a business, data used by a business, functions that describe the operation of a business, and products or services offered by a business.

Successful companies often design their processes with the help of modeling tools. Modeling tools can depict, analyze and optimize the development of a business process, and can be used with other types of business information as well. A "modeling tool" may include software and/or other computerized components or modules that can be used to plan a business process or other business information, and can be used to model all or part of a business process or other aspects of a business. By way of example, a modelling tool can be used to generate descriptions of business information in a "description notation." A description notation can be a format for written or executable computer code, such as WSDL (Web Services Description notation) or BPEL (Business Execution Language for Web Services), or a description notation can be a formalized way of graphically illustrating concepts, such as EPC (event-driven process chain) or VAC (value-added chain diagram).

Modeling tools are commercially available from various vendors. For example, the ARIS Platform of IDS Scheer AG (Saarbruecken, Germany) has been a market leader for Business Process Modeling tools. ARIS provides several description notations proven in practice to enable businesses to optimize their strategy and processes. By providing description notations well suited for modeling different facets of a business, ARIS enables business information to be modeled at varying levels of detail One of the description notations supported by ARIS is EPC notation. A diagram in EPC notation is an ordered graphical representation of events and functions. Further, an EPC diagram provides connectors that allow alternative and parallel execution of processes. For example, EPC diagrams may include logical operators, such as OR, AND, and XOR, that describe relationships between elements of the process. An "element" may refer to one step or activity, for example. Additionally, in an EPC model, logical relationships between elements are termed a "control flow." However, an EPC model, while graphical, does not actually implement a business process. It is merely a schematic representation of a business process.

Using EPCs, the procedural organization of a company can be defined. Links between concepts within the data, function and organizational view can be used to represent various business processes. The EPC can thus be used to describe the details of functions or activities within a business process. EPCs can be thought of as logical models, and are generally appropriate for modeling business processes or other views of a business.

Another description notation supported by ARIS is business process modeling notation, or BPMN. BPMN is a description notation that uses graphical constructs to model business processes or workflows. BPMN notation provides some graphical symbols that have analogous symbols in EPC notation. For example, BPMN provides an activity symbol that is analogous to an EPC function. BPMN also provides logical operators that operate on activities.

As described in U.S. Patent Publication Nos. US-2006-0293941-A1, US-2007-0005618-A1, and US-2007-0266377-A1, the disclosures of which are expressly incorporated herein by reference to their entireties, ARIS also provides a graphical description notation for business process execution language (BPEL). BPEL is an XML-based standard language for task-sharing via Web services. ARIS BPEL notation allows for the representation of BPEL processes in BPEL Process Model (BPM) and BPEL Allocation diagrams (BPADs).

Using BPEL notation, BPEL code can be represented abstractly in a BPM, and elements within the BPM can be described in more detail by using BPADs. In this way, a user can formally describe technical aspects of a business process, in a graphical description notation as BPMs and BPADs. BPEL-compliant XML code can be generated from BPMs and BPADs, so that web services can be invoked to implement various steps in the business process. ARIS users can also use UML as a description notation to model processes at the design specification level.

In many cases, it is desirable to transform between various description notations. For example, a user may have an EPC model that the user would like to convert to BPMN notation, or to ARIS BPEL notation. One approach is to simply write software code to transform the description notations. However, such an approach is problematic and prone to error. Drafting software code is also inefficient and requires technical personnel. Therefore, it is desirable to provide a more flexible and efficient approach that allows business users to transform models between various description notations.

SUMMARY

Consistent with embodiments of the invention, systems and methods are provided for transforming models between description notations. In accordance with certain embodiments, systems and methods are provided for graphically developing rules for transforming models between description notations. The transformation rules may be used to transform a model in a source description notation to a new model in a target description notation. In one embodiment, graphical constructs are provided including symbols in the source description notation and the target description notation. The constructs for the source description notation are arranged in a source pattern, and the constructs for the target description notation are arranged in a target pattern, according to user instructions. The patterns are provided to a transformation engine and can subsequently be accessed to transform a model in the source description notation to a model in the target description notation.

Consistent with an embodiment of the invention, a computerized method is provided for enabling a user to graphically develop a transformation rule between a source description notation and a target description notation. The method may include: providing a source group of graphical constructs in a database, the source group of graphical constructs including symbols available in the source description notation; providing a target group of graphical constructs in the database, the target group of graphical constructs including symbols available in the target description notation; providing a source pattern area for a user to construct a source pattern in the source description notation using the source group of graphical constructs; providing a target pattern area for a user to construct a target pattern in the target description notation using the target group graphical constructs; arranging the source graphical constructs in the source pattern area according to user instructions to construct the source pattern; arranging the target graphical constructs in the target pattern area according to user instructions to construct the target pattern; sending the source pattern and the target pattern to a transformation engine; and accessing a transformation rule provided by the transformation engine, the transformation rule being based on the source pattern and the target pattern.

Consistent with an embodiment of the invention, a computerized method is provided. The method may include: receiving a source model represented in a source description language; retrieving a source pattern represented in the source description language; retrieving a target pattern represented in a target description language, the target pattern describing how to convert the source pattern into the target description language; identifying a source fragment in the source model that matches the source pattern; and generating a target model fragment in the target description language based on the target pattern.

Consistent with an embodiment of the invention, a computer readable medium is provided comprising instructions for causing a computer to execute a method for enabling a user to graphically develop a transformation rule for transforming from a source description notation to a target description notation. The method may include: providing a source group of graphical constructs in a database, the source group of graphical constructs including symbols available in the source description notation; providing a target group of graphical constructs in the database, the target group of graphical constructs including symbols available in the target description notation; providing a source pattern area for a user to construct a source pattern in the source description notation using the source group of graphical constructs; providing a target pattern area for a user to construct a target pattern in the target description notation using the target group graphical constructs; arranging the source graphical constructs in the source pattern area according to user instructions to construct the source pattern; arranging the target graphical constructs in the target pattern area according to user instructions to construct the target pattern; sending the source pattern and the target pattern to a transformation engine; and accessing a transformation rule provided by the transformation engine, the transformation rule being based on the source pattern and the target pattern.

Consistent with an embodiment of the invention, a computer readable medium is provided comprising instructions for causing a computer to execute a method. The method may include: receiving a source model represented in a source description language; retrieving a source pattern represented in the source description language; retrieving a target pattern represented in a target description language, the target pattern describing how to convert the source pattern into the target description language; identifying a source fragment in the source model that matches the source pattern; and generating a target model fragment in the target description language based on the target pattern.

Consistent with an embodiment of the invention, an apparatus is provided for enabling a user to graphically develop a transformation rule for transforming from a source description notation to a target description notation. The apparatus may include a processor and a model creation software that executes the following steps on the processor: providing a source group of graphical constructs in a database, the source group of graphical constructs including symbols available in the source description notation; providing a target group of graphical constructs in the database, the target group of graphical constructs including symbols available in the target description notation; providing a source pattern area for a user to construct a source pattern in the source description notation using the source group of graphical constructs; providing a target pattern area for a user to construct a target pattern in the target description notation using the target group graphical constructs; arranging the source graphical constructs in the source pattern area according to user instructions to construct the source pattern; arranging the target graphical constructs in the target pattern area according to user instructions to construct the target pattern; sending the source pattern and the target pattern to a transformation engine; and accessing a transformation rule provided by the transformation engine, the transformation rule being based on the source pattern and the target pattern.

Consistent with an embodiment of the invention, an apparatus is provided. The apparatus may include a processor and a transformation engine that executes the following steps on the processor: receiving a source model represented in a source description language; retrieving a source pattern represented in the source description language; retrieving a target pattern represented in a target description language, the target pattern describing how to convert the source pattern into the target description language; identifying a source fragment in the source model that matches the source pattern; and generating a target model fragment in the target description language based on the target pattern.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
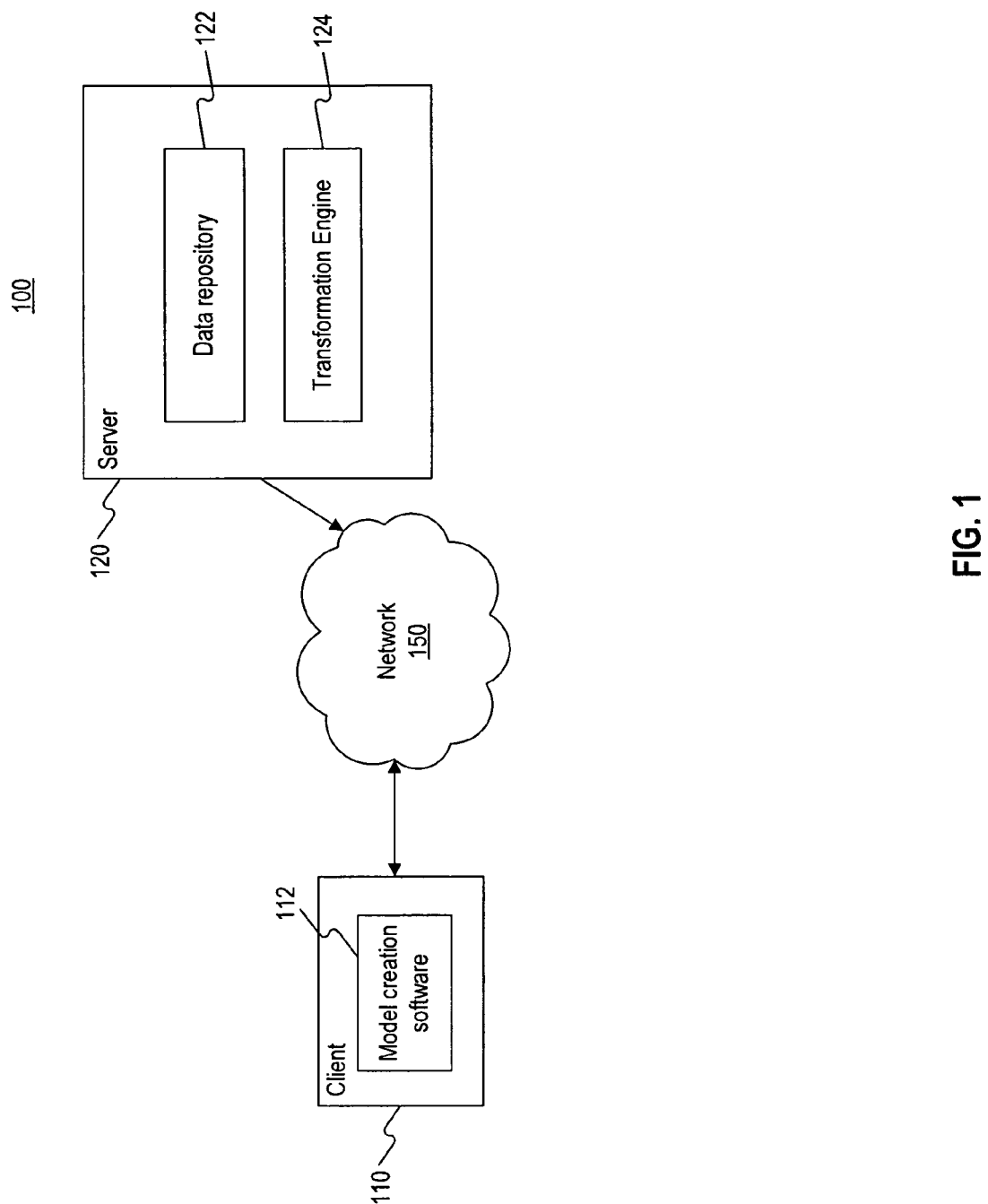
FIG. 1 illustrates a block diagram of an exemplary system environment for graphically develop transformation rules, consistent with an embodiment of the invention.

Reference will now be made in detail to the exemplary embodiments of the invention, examples of which are illustrated in the accompanying drawings. Wherever possible, the same reference numbers will be used throughout the drawings to refer to the same or like parts.

Systems and methods consistent with the present invention enable a user to graphically develop one or more transformation rules for transforming from a source description notation to a target description notation. As used herein, the term "description notation" refers to any graphical or written way of describing business information, including business processes. Examples of description notations include EPC notation, VAC notation, BPEL graphical symbols, XML, BPEL-compliant XML, UML component diagram notation, and BPMN. Other description notations or "meta models" can also be defined by users. As will be appreciated by those skilled in the art, other forms of description notation may also be used to represent business processes that processed or transformed consistent with the principles of the present invention. Embodiments of the invention may also be implemented for transforming description notations related to non-business processes, such as administrative or educational processes.

To model a business process, a graphical description notation may be utilized by a business process designer to create a diagram or similar graphical representation of the business process. In such a diagram, graphical constructs such as EPC symbols may represent elements in the business process. As used herein, the term "graphical construct" refers to any combination of symbols, text, color, images, or pictures. Further, a "modeled business process" as that term is used herein means a business process that is represented by a set of graphical constructs, each of the graphical constructs being logically related to at least one other graphical construct. The logical relationships between graphical constructs may be indicative of sequence, order, conditional branching, initiation, termination, and the like as required or defined for the elements in the business process.

A modeled business process may be stored as objects in a database or memory. Such objects may represent the graphical constructs of, for example, an EPC diagram. Further, the logical relationships between the graphical constructs can be maintained as attributes of the objects corresponding to the graphical constructs. It is also possible to store annotations defined by a business process designer as attributes of the objects corresponding to the graphical constructs. The term "annotations" refers to any data, messages, or applications referenced in an EPC diagram for a specific business process.

An executable process may also be stored as objects in a database or memory. An executable process to execute a business process may be described using an executable language description notation. An "execution language description notation," as that term is used herein, refers to a description notation for execution languages, such as XML, BPEL, or WSDL (Web Services Description Language). In general, executable processes may be defined by a set of programming constructs that are stored as objects in a database or memory, with attributes such as logical relationships to other programming constructs and annotations. A "programming construct," as that term is used herein, refers to objects corresponding to execution language description notation, as well as graphical symbols representing such objects. The objects can be source code, compiled code, or executable code. In one embodiment, programming constructs are implemented through BPEL code and symbols.

Once a business or executable process has been modeled, it may be desirable to convert the model into another description notation. As used herein, the term "source model" generally refers to a modeled business or executable process in a "source graphical notation." The source model can be transformed into a "target model" in a target graphical notation. In the disclosed embodiments and examples presented herein, the source model is generally a model in EPC notation, and the target models are in either BPMN notation or ARIS BPEL notation. However, source and target models can be in any graphical description notation.

Consistent with an aspect of the invention, transforming a model to another description notation can be accomplished by allowing a user to graphically develop patterns to create a "transformation rule." As used herein, the term "source pattern" refers to a graphically developed pattern of symbols in a source notation, and the term "target pattern" refers to a graphically developed pattern of symbols in a target notation. Generally speaking, given an input source model in a source model notation, it is possible to find "source fragments" in the source model that match the source pattern. Then, a corresponding target fragment can be generated based on the target pattern. By generating and combining a number of target fragments based on matching source fragments in a source model, even complicated source models can be converted to a target model in a different graphical description notation. Thus, the combination of a source pattern in a source description notation and a target pattern in a target description can serve as a transformation rule to convert an existing model into another description language, e.g. the target description notation.

For purposes of illustration, embodiments of the invention are described herein with reference to implementations using an ARIS environment. As will be appreciated by one skilled in the art, however, embodiments of the invention are not limited to ARIS, and may be applied to or adapted for other environments, including computerized or software-based environments with modeling and/or graphical tools. As used herein, the term "software" encompasses any and all types of software, including computer software, computer program products, and program modules and components, including business and financial software applications and components.

FIG. 1 illustrates a block diagram of an exemplary system environment that comprises a modeling system 100, consistent with an embodiment of the invention. Modeling system 100 may include a client computer 110 with model creation software 112, and a server 120 with data repository 122 and transformation engine software 124. Although FIG. 1 shows a particular number and arrangement of components, any arrangement and number of components can be implemented. For example, there may be one or more clients 110 and/or servers 120.

Model creation software 112 may allow users to create or modify models using graphical notations such as EPC or BPMN, and these models may be stored in data repository 122. Model creation software 112 may also allow users to create source patterns and target patterns in graphical notations. As discussed below, transformation engine software 124 may use one or more transformation rules comprising source and target patterns to convert a model from one graphical notation to a new model in another graphical notation.

Client 110 and server 120 can each include one or more processors, storage devices, applications, and/or other hardware or software. In one embodiment, client 110 is a personal computer or laptop and server 120 is a server that implements a database. Communication network 150, which can be implemented by any combination of wired or wireless technologies, allows client 110 and server 120 to communicate with one another for purposes of, for example, data retrieval and storage. Communication network 150 can be virtually any type or combination of networks, including a WAN such as the Internet, an intranet, and/or a home or office-based LAN.

For the purposes of this description, the major conceptual functions of the referenced embodiments are described herein as wholly resident on separate computers or devices. Alternative embodiments wherein the processing described on client 110 and server 120 is distributed across multiple computers, processors or modules are also possible. In addition, it is possible to combine the functionality of one or more of client 110 and server 120 into one device or machine. In one exemplary embodiment, model conversion software 112 can exist entirely on a server distinct from client 110 and server 120, but accessible via network 150. For example, model conversion software 112 may run on a separate server (not shown in FIG. 1) that is connected by a LAN to server 120, and client 110 may be connected by a WAN to both this server and server 120. As will be appreciated by those skilled in the art, other arrangements and system environments are possible in view of the teachings of the present invention.

Consistent with an embodiment, modeling system 100 may be implemented in an ARIS environment. In such a case, models such as EPC business models and BPEL processes may be stored in data repository 122, in a manner consistent with the ARIS framework. The ARIS framework allows various graphical description notations, and can be extended to textual description languages as well. Models can be implemented in a graphical description notation using symbols that are defined by the notation. ARIS also allows users to define their own meta models that can utilize graphical description notations based on, for example, symbols provided by ARIS.

Figure 2:
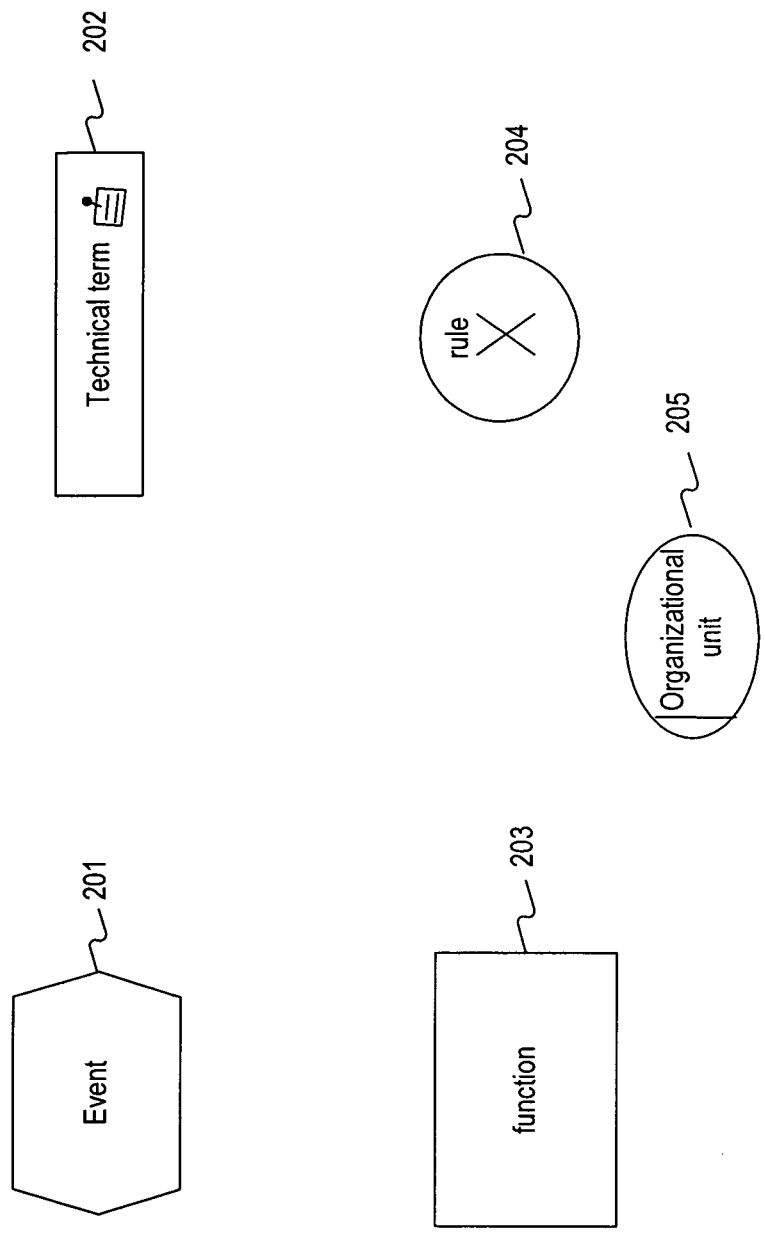
FIG. 2 illustrates exemplary ARIS EPC symbols that may used to model a business process, consistent with certain embodiments of the invention.

By way of example, ARIS EPC symbols that may used to model a business process are depicted in FIG. 2. Event symbol 201 represents an event, which indicates controlling or influencing the procedure of a business process modeled by an EPC diagram. Technical term symbol 202 represents some technical data used in the business process. Function symbol 203 represents a function. Predetermined events trigger functions, and are the results of functions. Unlike a function, which is a time-consuming occurrence, an event is related to one point in time. A function is a technical task or activity performed in support of one or more company objectives. Rule symbol 204 represents a rule. Rules define the logical links between the symbols they connect. Organizational unit symbol 205 represents an organizational unit within a larger organization, such as a human resources department within a corporation.

Figure 3:
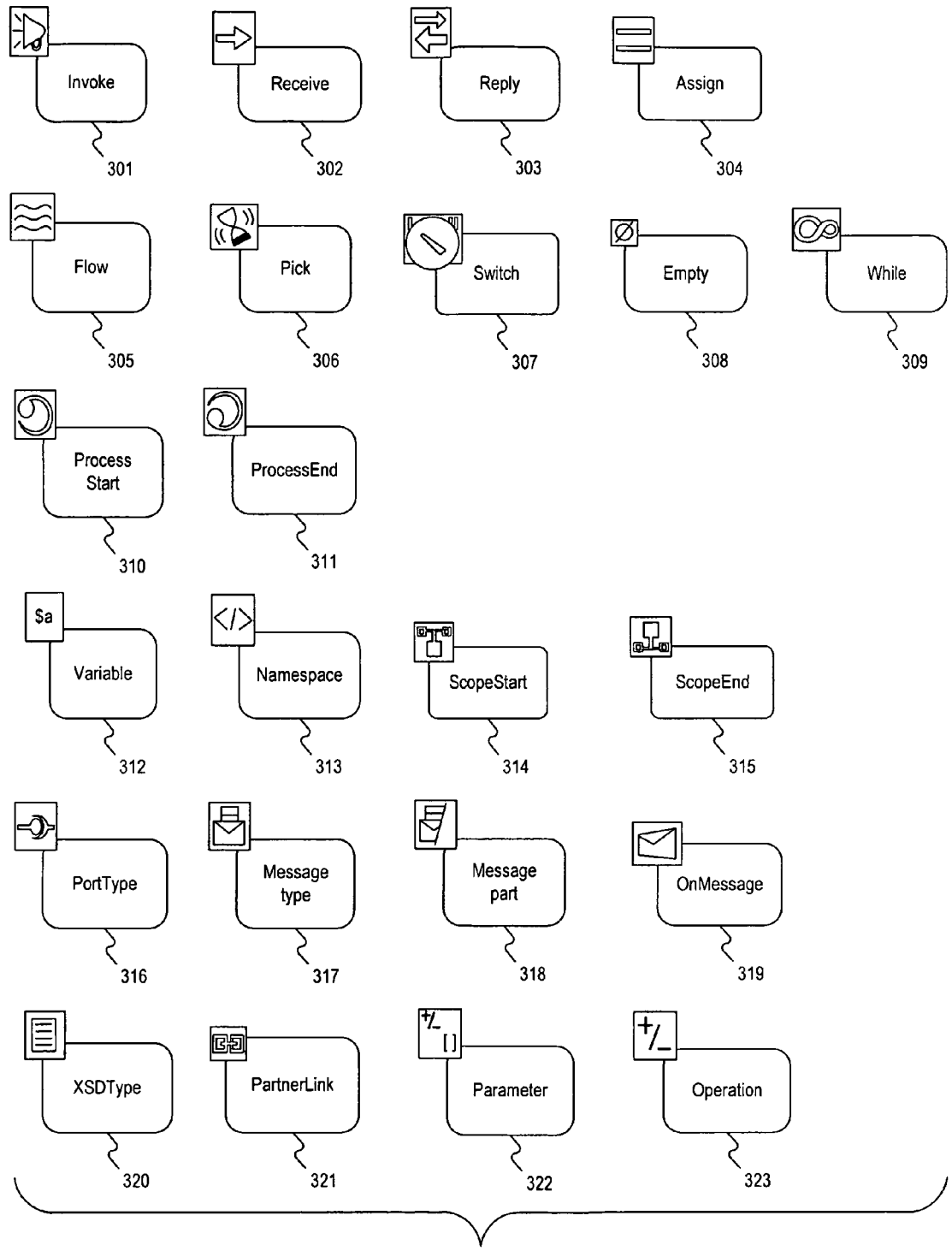
FIG. 3 illustrates exemplary ARIS BPEL symbols that may used to represent an executable process, consistent with certain embodiments of the invention.

Another example of a graphical description notation provided by ARIS is illustrated in FIG. 3. FIG. 3 depicts a number of ARIS BPEL symbols that may be used in combination to represent an executable process. The ARIS BPEL symbols of FIG. 3 are exemplary of what can be used to implement embodiments of the invention. Other BPEL symbols can also be used, such as those available from Oracle and IBM.

Referring to FIG. 3, each BPEL symbol represents a BPEL concept defined by the BPEL standard. For example, invoke symbol 301 represents invoking an operation, and is described at Chapter 11.3 of the BPEL 1.1 standard, which is available at dev2dev.bea.com/webservices/BPEL4WS.html and expressly incorporated herein by reference to its entirety. Receive symbol 302 represents an incoming action, as described in Chapter 11.4 of the BPEL standard. Reply symbol 303 represents an action in reply to an incoming action, and is described in Chapter 11.4 of the BPEL standard. Assign symbol 304 is an abstract depiction of an assignment and is described in Chapter 11.5 of the BPEL standard.

Flow symbol 305 represents a flow structured activity, described in the Chapter 12.5 of the BPEL standard. Flow symbol 305 may create a set of concurrent activities that are directly nested within it. Pick symbol 306 represents a structured activity pick, described in Chapter 12.4 of the BPEL standard. Pick symbol 306 may await an occurrence of a set of events, at which point an activity that is associated with the event or events may be performed. Switch symbol 307 represents a switch structured activity as described in Chapter 12.2 of the BPEL standard. Empty activity symbol 308 represents an empty basic activity, as described in Chapter 11.8 of the BPEL specification. While activity symbol 309 represents a while loop, and is described in Chapter 12.3 of the BPEL standard.

Process start symbol 310 represents the start of a BPEL process, and process end symbol 311 represents the end of a BPEL process. Variable symbol 312 represents a BPEL variable element, as described in Chapter 9.2 of the BPEL standard. Namespace symbol 313 represents an XML Namespace, as described in "Namespaces in XML", W3C, REC-xml-names-19990114, the disclosure of which is expressly incorporated herein by reference to its entirety. Scope start symbol 314 represents the beginning of a scope within a BPEL process, and scope end symbol 315 represents the end of a scope within a BPEL process. Scope is described in Chapter 13 of the BPEL standard.

PortType symbol 316 may represent a WSDL (Web Services Description Language) port type and may include an icon that resembles an interface as a connection point of between two entities. Port types are described in the Chapter 2.4 of W3C WSDL 1.1, which is available at vww.w3.org/TR/wsd and expressly incorporated herein by reference to its entirety. Message type symbol 317 relates to a WSDL message and may include an icon that resembles an envelope with a text document, thereby reflecting a relationship with an "XSDType" symbol. Message types are described in Chapter 2.3 of W3C WSDL 1.1. Message part symbol 318 represents part of a WSDL Message, as described in the Chapter 2.3.1 of W3C WSDL 1.1. OnMessage symbol 319 an incoming message as a definition of an event handler part within a BPEL process, and is described in Chapter 13.5.1 of the BPEL standard.

XSDType symbol 320 represents an XSD type, as described in the Chapter 3 of W3C, REC-xmlschema-1-20041028, which is expressly incorporated herein by reference to its entirety. XSDTypes can define the payload of a Message Part, the Message Part being part of a Message Type. Partnerlink symbol 321 represents a partner, as described in the Chapter 7.3 of the BPEL standard. Parameter symbol 322 represents a parameter of a WSDL operation, as described in Chapter 2.4 of W3C WSDL 1.1. Operation symbol 323 represents an operation of a WSDL port type, as described in Chapter 2.4 of W3C WSDL 1.1.

As indicated above, each of the BPEL symbols depicted in FIG. 3 corresponds to a BPEL concept described in the standard. Other BPEL symbols may also be provided, such as those defined in ARIS, but are not shown in FIG. 3.

Figure 4:
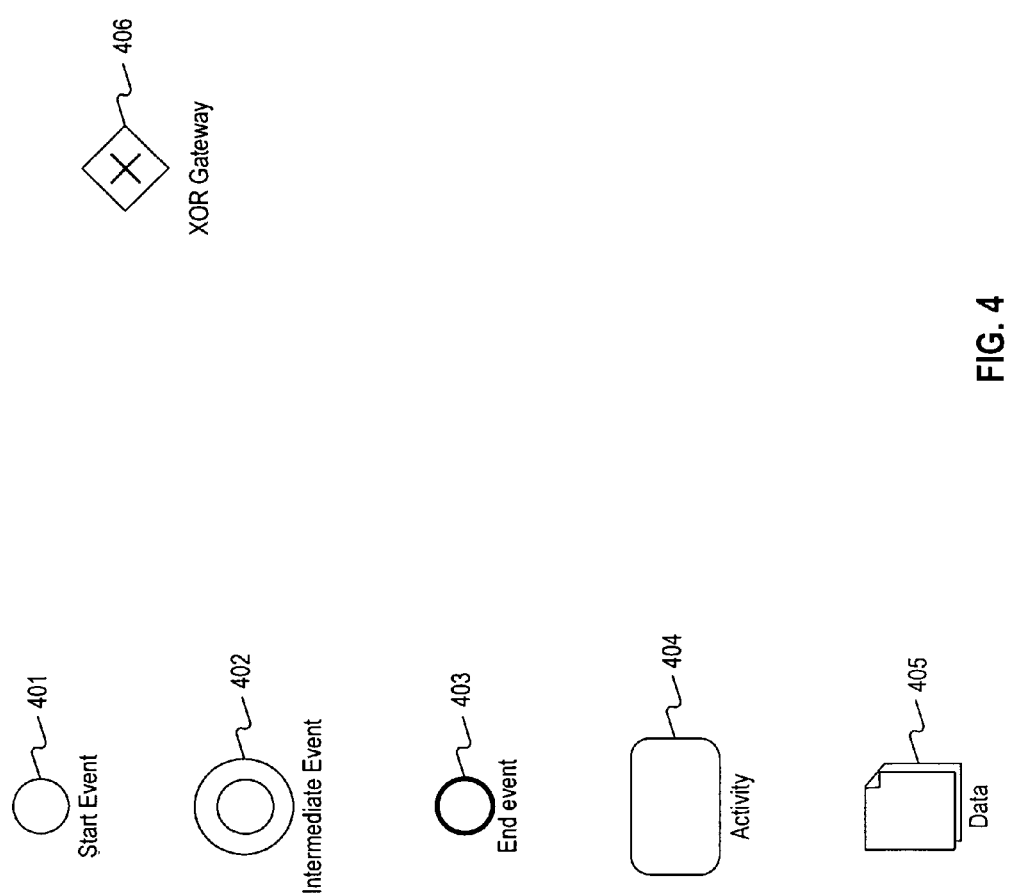
FIG. 4 illustrates exemplary BPMN symbols that may used to model a business process, consistent with certain embodiments of the invention.

Another example of a graphical description notation provided by ARIS is illustrated in FIG. 4. FIG. 4 depicts a number of BPMN symbols that may be used in combination to model a business process. BPMN is widely known and information on on BPMN notation is available from numerous sources, such as www.bpmn.org. Referring to the examples in FIG. 4, start event symbol 401 indicates an event that starts a process. Intermediate event 402 indicates an event that occurs during a process, and may affect the flow of the process. End event symbol 403 indicates an event that ends a process. Activity symbol 404 indicates work performed by a company, e.g. a process or sub-process. Data symbol 405 represents data used as an input to an activity, or data that is an output of an activity. XOR gateway symbol 406 represents an exclusive OR type flow control, i.e. one flow or another but not both.

Each of the symbols described above with respect to FIGS. 2-4 will generally correspond to an underlying data object. For example, if an EPC function symbol 203 appears in a model, the symbol is representing an underlying data object. To keep track of which objects appear as symbols in which models, each object may store "occurrences" that indicate which models the object appears in. As used herein, the terms "symbol" and "object" are used to refer to a graphical symbol in the figures, depending on whether the symbol itself or the underlying data object is being referenced.

It is possible for an object to appear in two models, in two different description notations. EPC function symbol 203 might appear in an EPC diagram, and BPMN activity symbol 404 might appear in a BPMN diagram, but both symbols may actually represent the same underlying data object. In this case, the object would have two occurrences, one reflecting its existence as EPC function symbol 203 in the EPC diagram, and one reflecting its existence as BPMN activity symbol 404 in the BPMN diagram. The object may have a name attribute that is displayed with the symbols in both the EPC and BPMN diagrams.

Relationships between objects can be represented by lines connecting two symbols. The connections themselves can also be stored as objects having occurrence information. Objects representing connections between symbols can have name attributes, as well as an attribute reflecting the relationship between the symbols they connect.

Figure 5:
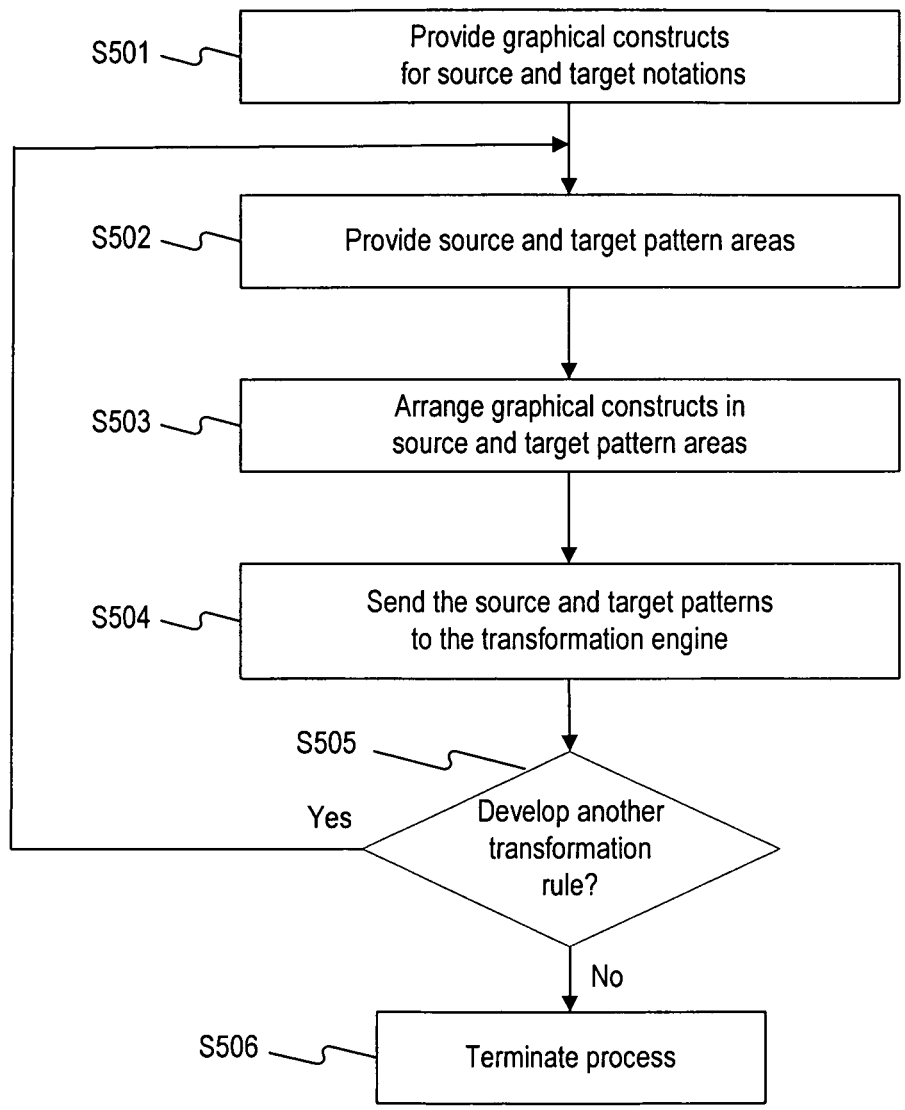
FIG. 5 is a flowchart of an exemplary method, consistent with an embodiment of the invention.

FIG. 5 is an exemplary flowchart of a method 500, consistent with an embodiment of the invention. FIG. 5 illustrates an exemplary method for enabling a user to graphically develop transformation rules for transforming from a source description notation to a target description notation. Both the source and target description notations can be any of the graphical notations described above, e.g. EPC notation, ARIS BPEL symbols, BPMN, etc. Any other graphical notation that represents a process performed in a defined sequence can also be used in the method of FIG. 5.

As shown in FIG. 5, the method starts with step S501 and providing graphical constructs for the source and target notations. For example, assume a user at client 110 wants to develop a transformation rule for transforming from an EPC model to a BPMN model. In such a case, step S501 may include providing the user with access to a group of graphical constructs in the source notation, e.g. EPC notation. The user could also be provided with a group of graphical constructs in the target notation, e.g. BPMN notation. The graphical constructs can be arranged to graphically generate a rule for transforming an EPC model into a BPMN model.

Figure 6:
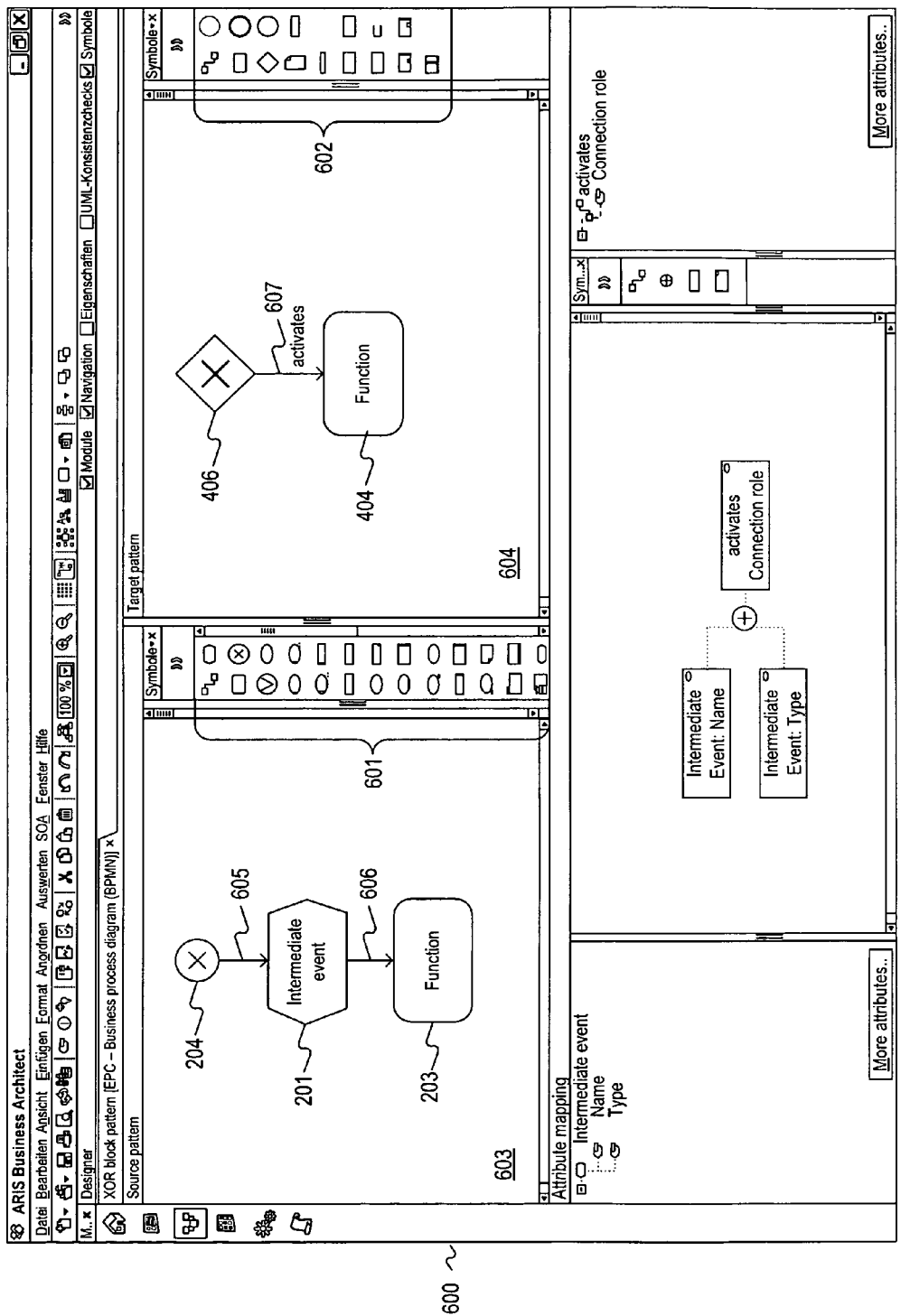
FIG. 6 illustrates an exemplary graphical user interface for developing transformation rules, consistent with an embodiment of the invention.

As shown in the exemplary embodiment of FIG. 6, the source and target graphical constructs can be provided to the user by displaying symbols in a pattern designer window 600 at client 110. Pattern designer window 600 includes a source notation symbol area 601 and a target notation symbol area 602. In this example, the source notation is EPC notation, so source notation symbol area 601 includes a variety of EPC symbols, such as those illustrated in FIG. 2. Similarly, because in this example the target notation is BPMN notation, target notation symbol area 602 includes a variety of BPMN symbols, such as those illustrated in FIG. 4. The symbols in areas 601 and 602 may be stored in a database, such as data repository 122, or in a local database on client 110.

Step S502 includes providing source and target pattern areas where the user can work to create a source and target pattern using the symbols in areas 601 and 602. Referring again to FIG. 6, pattern designer window 600 includes a source pattern area 603 and a target pattern area 604. The user is able to click or otherwise select symbols in source notation symbol area 601 and then click on or otherwise select source pattern area 603. In response, model creation software 112 will create a new symbol in source notation area 603. In the example shown in FIG. 6, the user has selected the following EPC symbols for placement in source pattern area 603: rule symbol 204, event symbol 201, and function symbol 203. The user can also click or otherwise select symbols in target notation symbol area 602, and then click on or otherwise select target pattern area 604 to place a new symbol in target pattern 604. In the example shown in FIG. 6, the user has selected the following BPMN symbols for placement in target pattern area 604: XOR gateway 406 and activity 404.

At step S503, model creation software 112 arranges the graphical constructs in the source and target pattern areas according to instructions provided by the user at client 110.

For example, the user can select and drag the various symbols in source pattern area 603 and target pattern area 604 to arrange them into desired source and target patterns. The user can also connect the various symbols in both areas using connections 605, 606, and 607. Connections can indicate relationships between the two symbols, e.g. XOR gateway 406 "activates" or has an activate relationship with activity 404, as indicated by connection 607.

At step S504, the user can decide that the source and target patterns they have created are finished and ready for storage. In one embodiment, the user can instruct that the patterns are ready for storage by selecting a button or entering a command (e.g., via a GUI). When the patterns are finished, model creation software 112 may send the source and target patterns to transformation engine 124 of server 120. Transformation engine 124 can then store the source and target patterns as one transformation rule.

In accordance with embodiments of the invention, a transformation rule may comprise a source pattern and a corresponding target pattern. Transformation engine 124 may store, collectively, source and target patterns to generate a transformation rule. As discussed in more detail below, transformation engine 124 can subsequently refer to a transformation rule and search a source model for fragments that match the source pattern in a given rule. When transformation engine 124 finds a matching fragment in a source model, transformation engine 124 can refer to the corresponding target pattern to determine how to transform the matching fragment of the source model into the target notation. In this way, a transformation rule represented by a source pattern and a target pattern is sufficient to convert a fragment in the source model into a fragment of a new target model.

In one embodiment, each symbol in the source pattern must match a corresponding symbol in the source model in order for a particular transformation rule to apply. In such as case, when graphically developing a transformation rule, a user may prefer to keep a source pattern as fundamental or simple as possible so that it is more likely to result in a match for relevant source models. In some embodiments, alternative symbols for a match may be defined, so that a match of either symbol is sufficient to cause a match. In some embodiments, the matching may be done not on the symbol in the source pattern, but rather the underlying object type. Thus, an object type that can be represented by several different symbols in a description notation can be matched for any of the possible symbols.

Consistent with embodiments of the invention, a user may graphically develop one or more of transformation rules for transforming source models. As source models may have varying complexities, there may be a number of different fragments present in any given source model. In order to provide a sufficient number of rules to transform an entire source model, each fragment in the source model may require a transformation rule with a matching source pattern. Thus, in certain cases, it may be necessary to develop more than one transformation rule. Referring again to FIG. 5, if a user wishes to continue developing transformation rules (S505; Yes), method 500 will return to step S502 so the user can graphically develop an additional transformation rule. When a user is finished developing transformation rules (S505; No), the method will proceed to step S506 and terminate.

After generating one or more transformation rules, a user can decide they would like to designate a source model in the source language that they would like to transform into a target model in the target language. The user can either use model creation software 112 to create a new source that they would like to transform, or simply designate an existing model in data repository 122. In this example, the source model will be an EPC model, and transformation engine 124 will generate a BPMN model from the EPC model according to the graphically generated transformation rule(s). Transformation engine 124 may also generate a diagram of the model and an XML representation of the model at this time.

Figure 7:
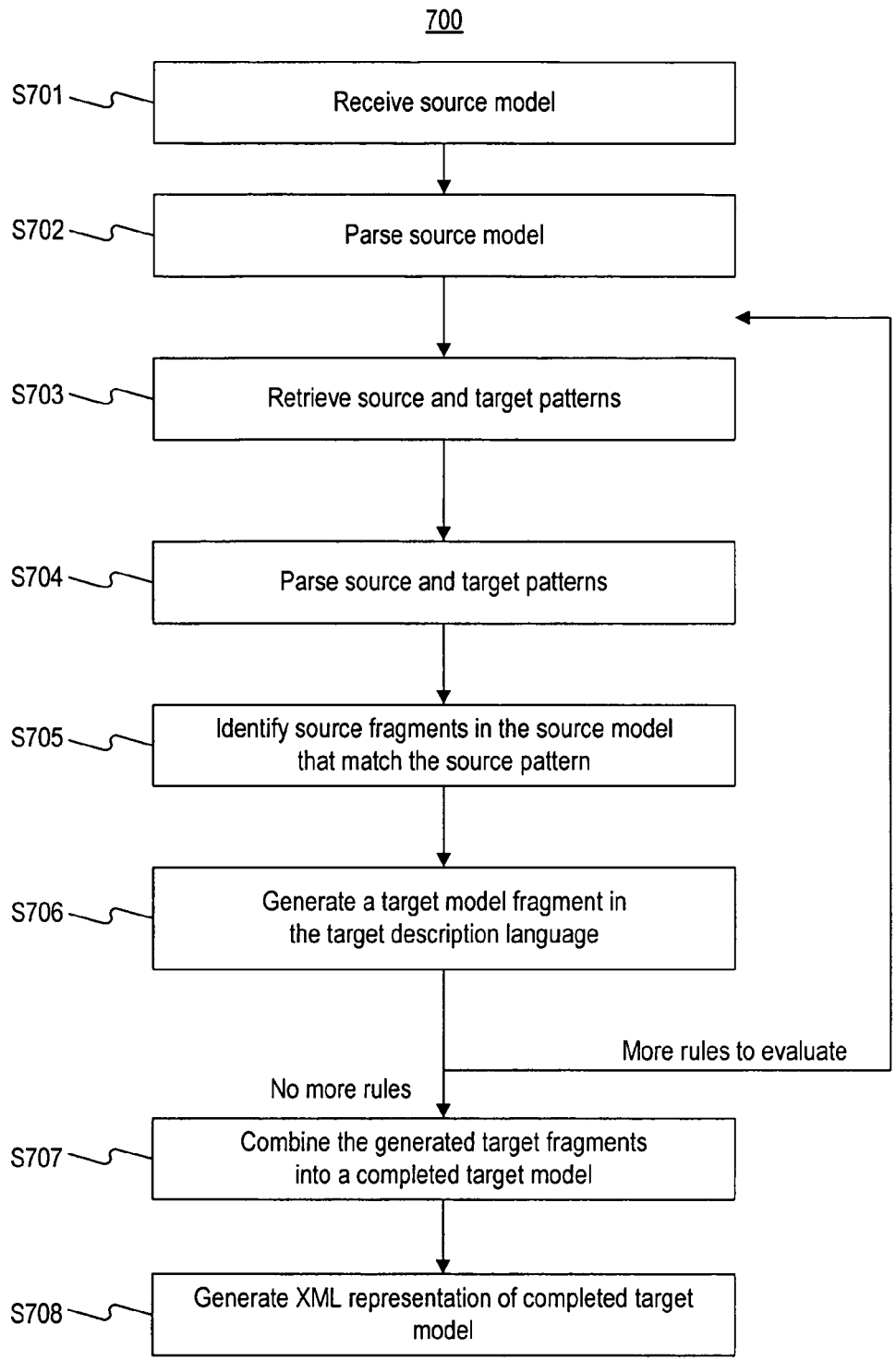
FIG. 7 is a flowchart of an exemplary method, consistent with an embodiment of the invention.
Figure 8:
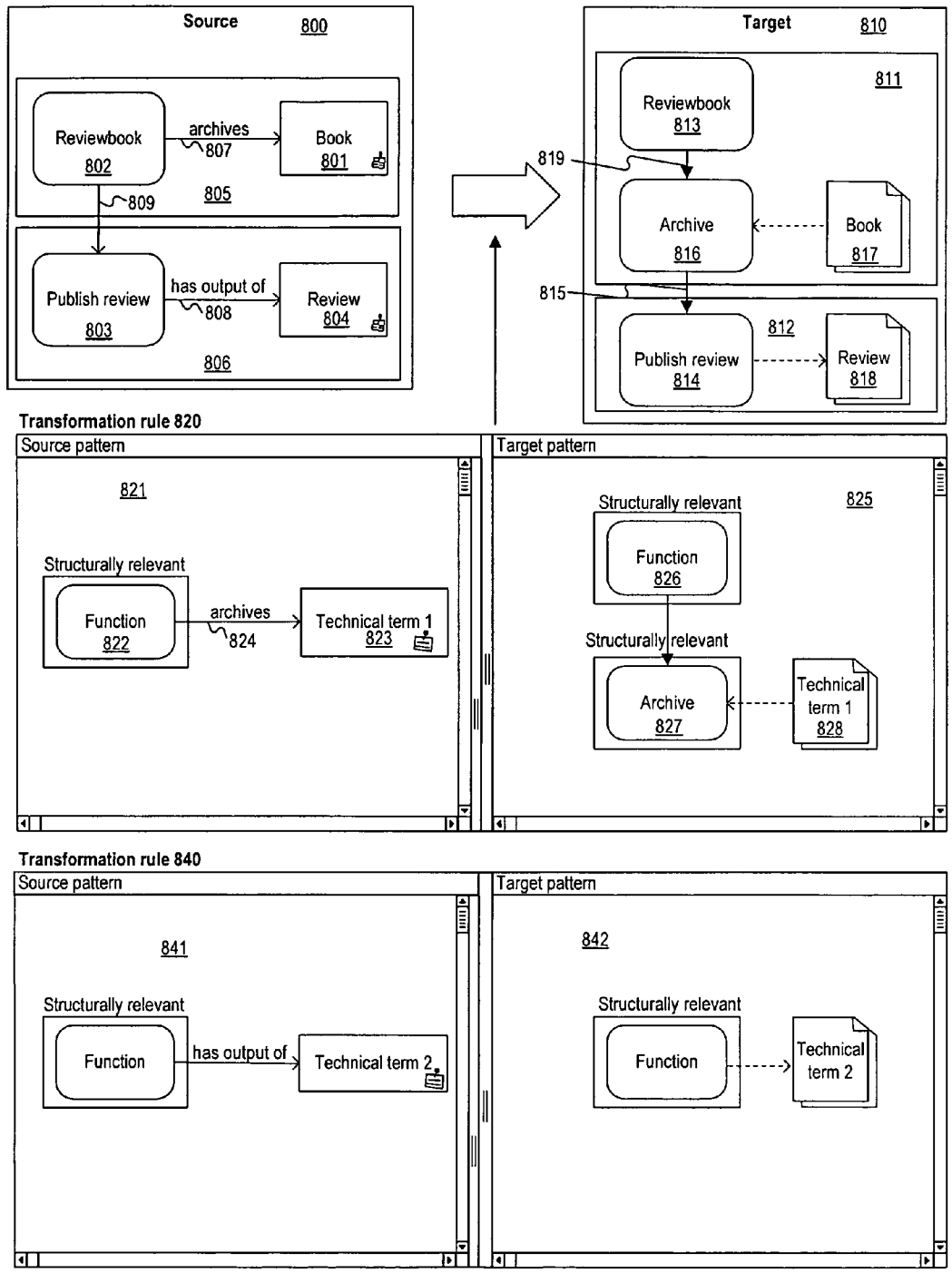
FIG. 8 illustrates an exemplary model transformation based on graphically developed transformation rules, consistent with an embodiment of the invention.

FIG. 7 is an exemplary flowchart of a method 700, consistent with an embodiment of the invention. FIG. 7 illustrates an exemplary method for generating a target model based on a source mode. The method of FIG. 7 will be described below with reference to FIG. 8. FIG. 8 illustrates an exemplary source model 800, an EPC diagram, and an exemplary target model 810, a BPMN diagram. As will be apparent for the following description, the method of FIG. 7 may be implemented to transform source model 800 to target model 810.

Method 700 can be implemented by transformation engine 124 on server 120. Before step S701 begins, it is assumed that transformation engine 124 has access to at least one graphically developed, transformation rule. Further, it is assumed that any such transformation rules have source patterns in a description notation that is the same as the input source model, and target patterns in a description notation that is the selected notation for the new target model the user wishes to generate.

For purposes of illustration, assume that a user has generated two transformation rules, shown as transformation rule 820 and transformation rule 840 in FIG. 8. Transformation rules 820 and 840 have source patterns 821 and 841, respectively, in EPC notation. Further, transformation rules 820 and 840 have target patterns 825 and 842, respectively, in BPMN notation. Thus, method 700 will be discussed below with an example where a user wishes to convert an existing EPC model into a new BPMN model based on these two transformation rules. In particular, the user will convert source model 800 in EPC notation to a new target model 810 in BPMN notation.

At step S701, transformation engine 124 receives source model 800 to transform into a target model. Source model 800 can created by the user using model creation software 112, or may already exist in data repository 122. Transformation engine 124 can receive source model 800 from model creation software 112. Alternately, if source model 800 is in data repository 122, transformation engine 124 may simply receive a designation of source model 800 from model creation software 112, and then retrieve source model 800 from data repository 122.

At step S702, transformation engine 124 parses the received source model. In this case, transformation engine 124 may include software that parses source model 800. A convenient data structure for storing parsed source models is a graph comprising a series of nodes. To create a graph by parsing source model 800, transformation engine 124 may store one node for each symbol and for each connection. Each node will indicate any predecessor or successor nodes. For example, transformation engine 124 will store one node for each of the following symbols: book term 801, review book function 802, publish review function 803, and review book term 804. The node for book term 801 will have connection 807 to review book function 802 as a predecessor node. The node for review book function 802 will have connection 807 to book term 801 as a successor node and also connection 809 to publish review function 803 as a successor node. The node for publish review function 803 will have connection 809 to review book function 802 as a predecessor node, and connection 808 to review book term 804 as a successor node. The node for review book term 804 will have connection 808 to publish review function 803 as a predecessor node.

At step S703, transformation engine 124 retrieves one transformation rule comprising a source pattern and a target pattern from data repository 122. The transformation rule may be part of a particular rule set for transforming between the source notation and the target notation. As discussed above, assume a user has generated transformation rules 820 and 840 for transforming EPC diagrams into BPMN diagrams using, for example, model creation software 112 and method 500. Transformation engine 124 retrieves the first available rule, transformation rule 820, from the stored transformation rules for converting EPC diagrams to BPMN diagrams.

At step S704, transformation engine software 124 parses the source pattern for the retrieved rule, in a manner analogous to that described for parsing source model 800 described above in step S702. In this case, transformation engine 124 parses source pattern 821 to store a graph with three nodes, one for each symbol and connection in source pattern 821. One node will represent function 822, another node will represent technical term 823, and the third node will represent archives connection 824. The node representing function 822 will have a field indicating that connection 824 to technical term 823 is a successor node, whereas the node representing technical term 823 will have a field indicating that connection 824 to function 822 is a predecessor node.

Also, at step S704, transformation engine 124 may parse the target pattern for the retrieved rule, in a manner analogous to that described for parsing source model 800. In this case, transformation engine 124 parses target pattern 825 to store a graph with five nodes, one for each symbol and connection in target pattern 825. One node will represent function activity 826, another node will represent archive activity 827, another node will represent technical term 828, and the remaining two nodes will represent the connections.

At step S705, transformation engine 124 identifies any source fragments in source model 800 that match source pattern 821. Transformation engine 124 may do so by searching the graph for source model 800 for any functions in an archives relationship with a technical term. Note that source pattern 821 includes generic function symbol 822, whereas source model 800 includes function 802 with the name "review book" and function 803 with the name "publish review." Function symbol 822 can match to both function 802 or function 803, regardless of their names.

Transformation engine 124 find matches in source model 800 by doing a node-by-node comparison of the graph for source pattern 821 with the graph for source model 800. In this case, transformation engine 124 will identify source fragment 805 as a matching fragment, because source fragment includes review book function 802 in an archives relationship with book term 801. While publish review function 803 could, on its own, match to function 822, publish review function 803 does not appear in a matching fragment, because publish review function 803 is not in an archives relationship with a term.

To identify the match with source fragment 805, transformation engine 124 traverses the graph of source model 800. Since review book function 802 does not have any predecessor nodes, review book function 802 serves as a "root" node in the graph. Starting with review book function 802, transformation engine 124 will note a partial match with source pattern 821, because source pattern 821 begins with a function and review book function 802 is a function symbol. Transformation engine 124 will then determine whether review book function 802 is a predecessor in an archives relationship with a technical term. In this case, review book function 802 is in such a relationship with book term 801, so transformation engine 124 will store an occurrence indicating a match for transformation rule 820 at source fragment 805. If multiple matches are found, each occurrence of the match can be stored in a list.

Note that in some circumstances a given source fragment will match more than one transformation rule. If there is no conflict between the matches, e.g. the matches can be consistently applied in the target model, then the matches can be consolidated in the target model. If there is a conflict between the matches, e.g. applying both matches would violate a semantic rule or other constraint, then priorities may be used to determine which rules should be applied.

In one embodiment, users are provided with the ability to prioritize the transformation rules. When a source fragment matches more than one source pattern, transformation engine 124 will only apply the rule with the highest priority. In most cases the user will wish to designate the transformation rules with the most specific source patterns, e.g. the source pattern with the most symbols and connections, as the highest priority transformation rules. Thus, the more "general" transformation rules, e.g. the rules with fewer symbols to match in the source pattern, will be applied only in the event the more specific rules do not apply. In one embodiment, transformation engine 124 by default will apply transformation rules in descending order of complexity. A table can be used for simple mappings that do not require or would not advantageously use graphical patterns. For example, one to one mappings between symbols, objects, and connections in different notations could be represented in a table rather than by a graphical transformation rule.

Transformation engine 124 will at this time traverse the remainder of the graph for source model 800. When transformation engine 124 reaches the node for publish review function 803, transformation engine 124 will note a partial match with function 822. However, because publish review function 803 has an "output of" relationship with review book term 804, and not an "archives" relationship, transformation engine 124 will not store an occurrence of a match for source fragment 806.

At step S706, transformation engine 124 generates a target model fragment in the target description language, e.g., BPMN, for each match in the list. In source model 800 there is only one match, e.g., source fragment 805, so transformation engine 124 will generate one target fragment. FIG. 8 illustrates the target fragment generated from source fragment 805 as target fragment 811 in target model 810. As part of generating target model 810, transformation engine 124 generates target fragment 811 by referring to target pattern 825, which illustrates how to transform source pattern 821 from EPC notation into BPEL notation. Thus, target fragment 811 comprises symbols such as those in target pattern 825, and also replicates the relationships between the symbols found in target pattern 825.

The names for each of these symbols in target fragment 811 are taken from source fragment 805 using "attribute mapping," discussed in more detail below. For now it is sufficient to appreciate that by default, the name attribute for a symbol in a source pattern will be replicated in the corresponding symbol in the target fragment, e.g. review book function 802 appears as review book activity 813, archives connection 807 appears as archives activity 816, and book technical data 801 appears as book data 817.

Once a target fragment is completed at step S706, transformation engine 124 determines whether there are remaining rules that have not been processed for EPC to BPMN transformation. If there are more rules to be evaluated, the method returns to step S703 and retrieves the next rule. Otherwise, if all the rules have been checked against source model 800, the method moves to step S707.

In this case there is another rule to check, e.g., transformation rule 840. Transformation engine 124 will go through steps S703-S706 to apply transformation rule 840 to source model 800. A match for source pattern 841 appears in source model 800 at source fragment 806, so transformation engine 124 will generate a new target fragment 812 based on target pattern 842. Thus, transformation engine 124 has converted source fragment 806 from EPC notation to BPMN notation in target fragment 812.

For the sake of clarity, steps S703-S706 have been described separately for each rule. In some embodiments, steps S703 and S704 can be performed for all of the rules that are to be evaluated before moving to step S705. Then, step S705 is performed on an object-by-object basis for each node in the graph of the source model, and the matches are evaluated in step S706.

Once transformation rule 840 has been applied, there are no more transformation rules, so the method moves to step S707. In step S707, transformation engine 124 combines target fragments 811 and 812 to create target model 810. Completed target model 810 is a BPMN representation of EPC source model 800.

Once the completed target model has been created, the method moves to step S708, where transformation engine 124 creates an XML representation of target model 810 can be created. The XML representation may be in an execution format such as BPEL. In some embodiments, a user can select a "text only" method where step S707 is skipped, no visual model is generated, and the source model is converted directly into an XML file.

In FIG. 8, there are two connections in target model 810. Connection 819 is part of target fragment 811, and was defined by target pattern 825 of transformation rule 820. However, connection 815 does not appear in either rule. In some embodiments, connection 815 is manually added by a user after target fragment 811 is generated, in order to "glue" target fragment 811 together. In other embodiments, the user can define default connections in target patterns that should be used to glue the target pattern together.

In some embodiments, connection 815 is generated by transformation engine 124 to glue together target fragment 811 with target fragment 812. Transformation engine 124 may glue together target fragments objects represented by EPC function symbol 203 and BPMN activity symbol 404 are, by default, defined to be "structurally relevant." When transformation engine 124 connects several target fragments together, it can do so by generating connections between structurally relevant objects. Transformation engine 124 can determine the direction for connection 815 because the graph for source model 800 has the node for review book function 802 as a predecessor node for publish review function 803.

Thus, when transformation engine 124 glues together target fragments 811 and 812, it does so by connecting archive activity 816 with publish review activity 814 using connection 815. Note that transformation engine 124 did not glue target fragment 811 to target fragment 812 using book data 817 and review data 818. This is because data objects such as book data 817 and review data 818 are, by default, not structurally relevant.

Consistent with an embodiment of the invention, users can be permitted to manually define which objects are structurally relevant. This functionality allows the user to override any objects that the meta model defines as structurally relevant, e.g. a function in EPC notation or an activity in BPMN. This can be accomplished using an object properties window 900, as illustrated in the exemplary embodiment of FIG. 9. By clicking on or otherwise selecting a symbol in a given model, the user can view object properties window 900. By clicking on or off structurally relevant element checkbox 901, the user can manually define whether the object is structurally relevant. For example, if the user had decided to make book data 817 and review data 818 structurally relevant, transformation engine 124 would have also connected book data 817 and review data 818. Similarly, if the user had decided to uncheck structurally relevant checkbox for archive activity 816 and publish review activity 814 (checked by default for activity symbols), transformation engine 124 would not have created connection 815 between archive activity 816 and publish review activity 814.

Figure 10:
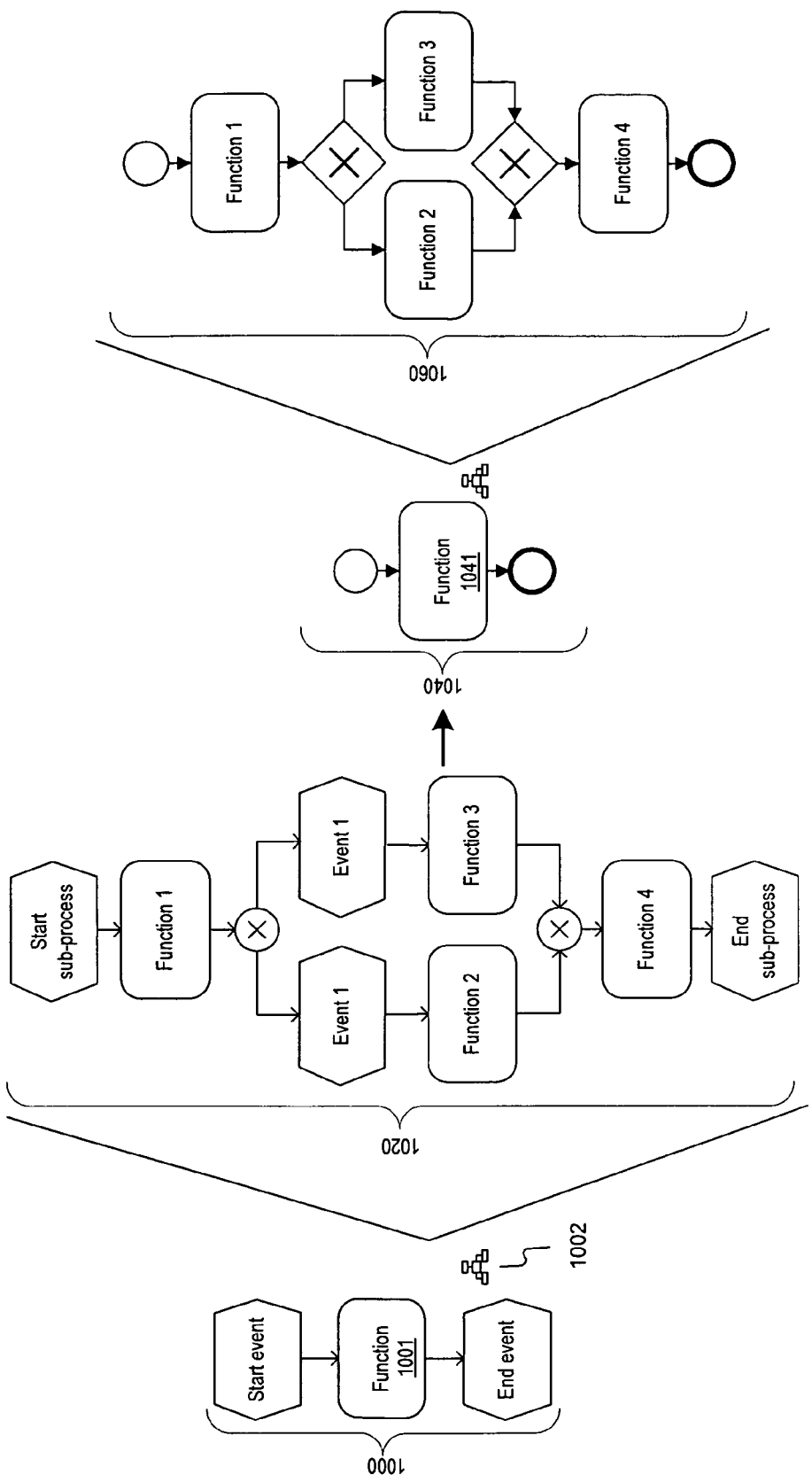
FIG. 10 illustrates an exemplary model transformation based on graphically developed transformation rules, consistent with an embodiment of the invention.

In some embodiments, a particular model may have a number of associated submodels. These submodels can be detailed views of symbols or objects within the parent model. By way of example, FIG. 10 illustrates a parent model 1000, with a submodel 1020. Submodel 1020 is an expansion of function 1001, e.g., a more detailed explanation or breakdown of function 1001. Expansion icon 1002 may be used to indicate that function 1001 or an underlying object has an associated submodel. A user viewing parent model 1000 may wish to understand more details about function 1001. To do so, the user can click expansion icon 1002, and submodel 1020 will be displayed. Thus, function symbol 1001 can serve as an abstraction that allows a user to consider model 1000 without having to view all of the details in submodel 1020.

Target model 1040 is a BPMN representation of model 1000, such as might be generated by using method 700 to transform model 1000 from EPC notation to BPMN notation. Target submodel 1060 is a BPMN representation of submodel 1020, and provides details about function activity 1041, the target model symbol corresponding to function 1001. Target submodel 1060 can also be generated using method 700 as discussed above.

Figure 12:
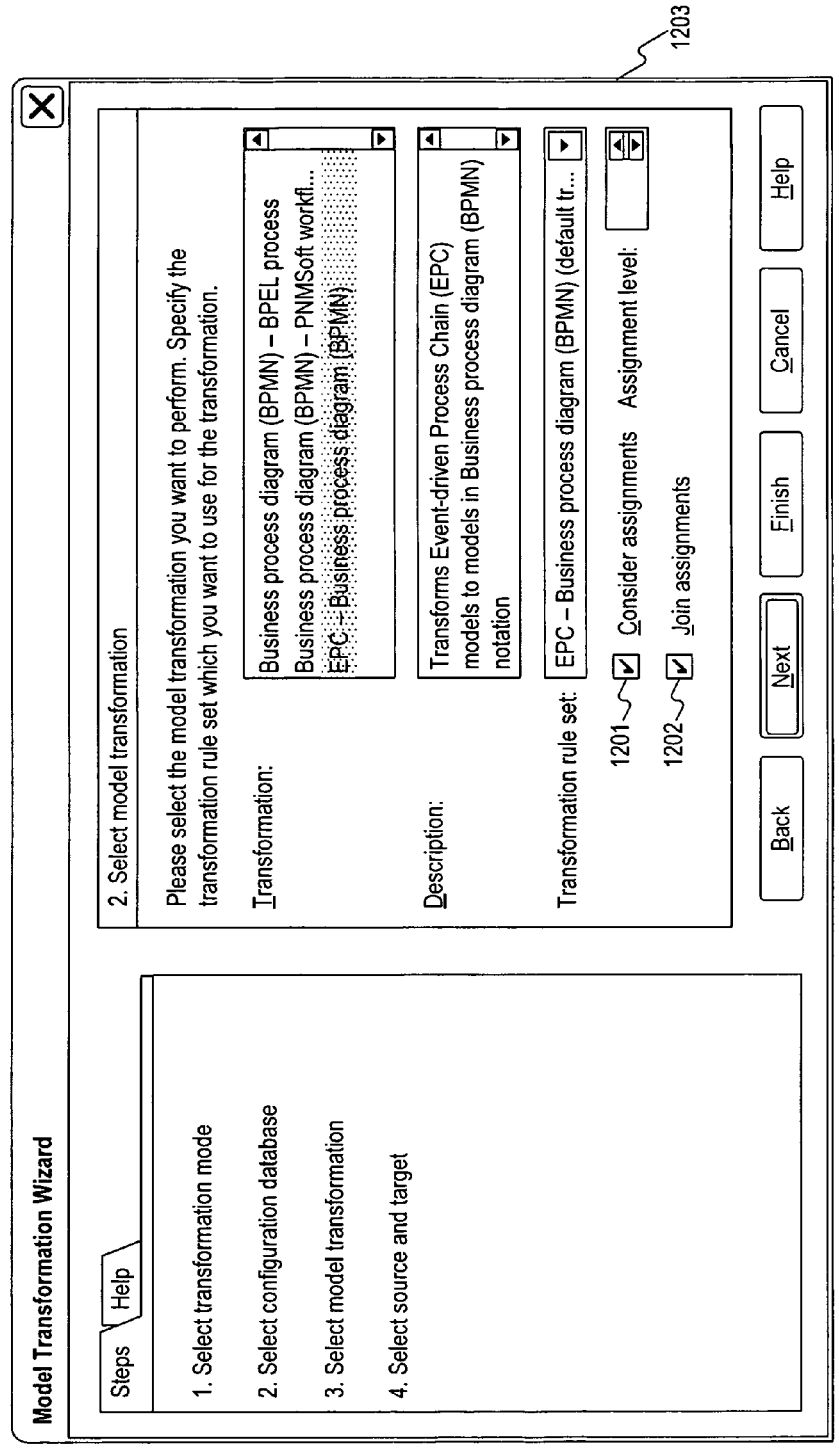
FIG. 12 illustrates an exemplary graphical user interface for setting transformation options, consistent with an embodiment of the invention.

A user who provides model 1000 to transformation engine 124 may desire to simply create a top-level model BPMN model corresponding to model 1000, without generating a corresponding BPMN model for submodel 1020. As shown in FIG. 12, a model transformation wizard may provide a user with the ability to select whether transformation engine 124 considers model assignments when generating a target model. If a user leaves a blank field in consider assignments checkbox 1201, transformation engine 124 will generate only target model 1040, i.e., transformation engine 124 will not consider any submodels assigned to the objects in model 1000.

However, if the user checks consider assignments checkbox 1201, transformation engine 124 will recursively iterate through any assigned models in model 1000 and generate corresponding target submodels. In this case, there is one assigned submodel 1020, so transformation engine 124 would generate one target submodel 1060. Assignment level field 1203 allows a user to select how many recursive layers transformation engine 124 will iterate through from a top level model such as model 1000. If the user selects 1, only submodels assigned to symbols in model 1000 will be considered. However, if the user selects 2, any submodels assigned to these submodels will also be considered. In this case, transformation engine 124 would also evaluate any submodels assigned to submodel 1020.

Figure 11:
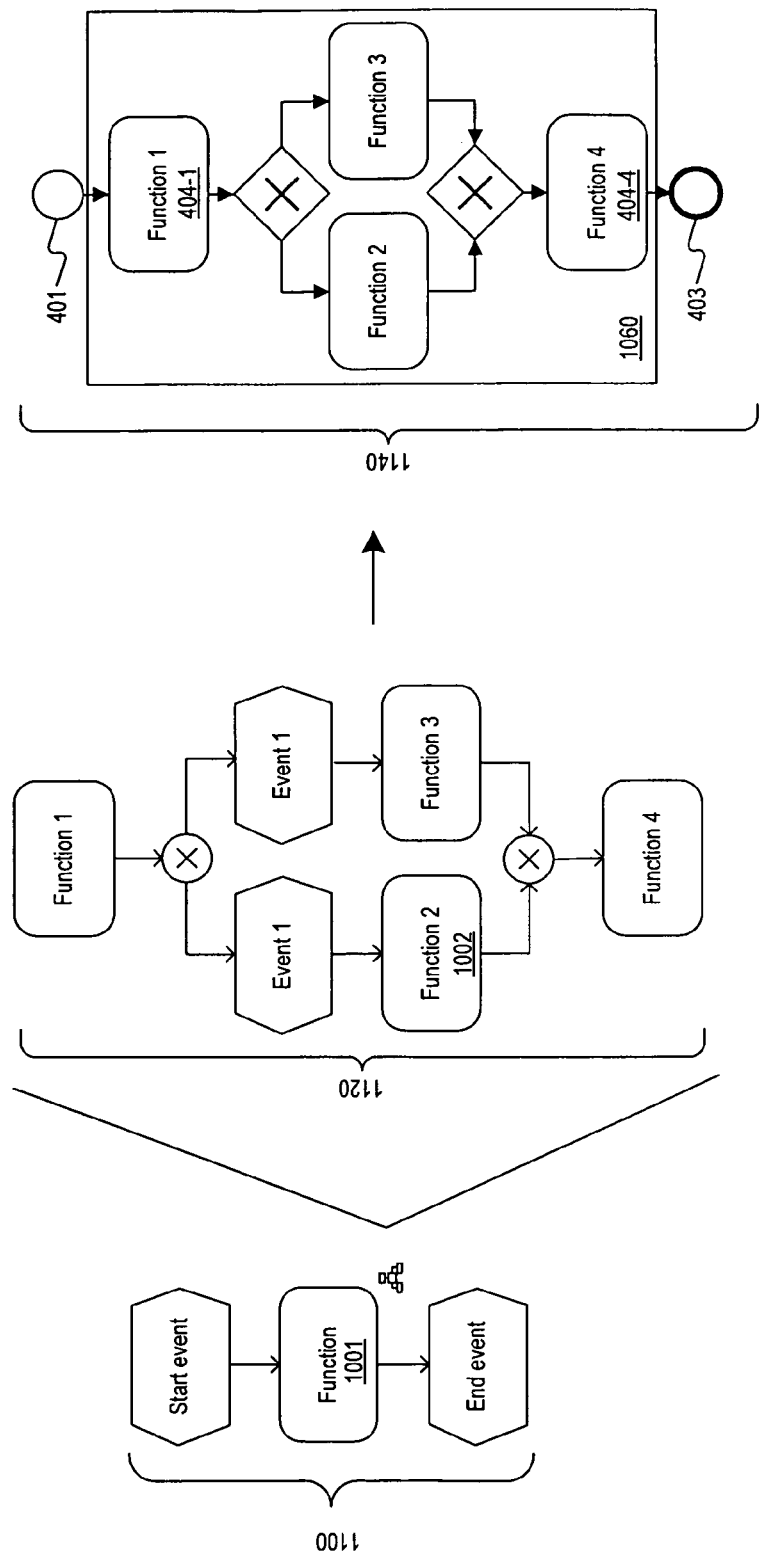
FIG. 11 illustrates an exemplary model transformation based on graphically developed transformation rules, consistent with an embodiment of the invention.

A user may also be provided with the option to generate a single model to represent all of the content in both model 1000 and submodel 1020. To do so, the user may select join assignments checkbox 1202. If the user selects this checkbox, transformation wizard 124 will not generate separate target models for model 1000 and submodel 1020. Instead, as shown in FIG. 11, transformation wizard 124 will "lift" target submodel 1060 into target model 1040 to create combined target model 1140. Transformation 124 does so by "gluing" target submodel 1060 into target model 1040 to create combined target model 1140.

As discussed above, BPMN activity symbols will by default correspond to a structurally relevant object. Similarly, BPMN start event symbol 401 and end event symbol 403 will by default correspond to structurally relevant objects. Thus, in step S707 of method 700 discussed above, transformation engine 124 will glue together start event 401 with function activity 404-1, and will also glue together function activity 404-4 with end event 403, because they are the structurally relevant symbols in combined target model 1140.

It can also be useful to allow a user to define some semantic checks to verify that a source model provided to transformation engine 124 meets certain formal requirements for transformation. For example, a user may wish to define certain source patterns that are not allowed to appear in a source model, e.g., a "negative" semantic check.

Figure 13:
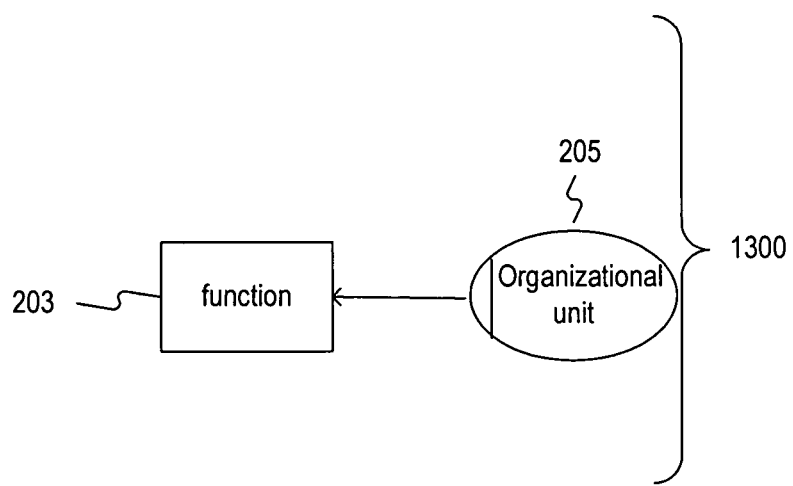
FIG. 13 illustrates an exemplary graphically developed semantic check, consistent with an embodiment of the invention.

An exemplary negative semantic check 1300 is shown in FIG. 13. Semantic check 1300 illustrates an organizational unit 205 connected to function 203. In many cases it would be perfectly acceptable for a function to be executed by a single organizational element. However, by defining semantic check 1300 in this fashion, more than one organizational unit will be needed to execute function 205. Semantic check 1300 would be useful, for example, for risk management purposes to effectively require a double-check by another organizational element for function 205.

In an exemplary embodiment, transformation engine 124 may apply semantic check 1300 during step S705 of method 700. Thus, semantic check 1300 would become just another source pattern that transformation engine 124 tries to match in a given source model. However, unlike transformation rules, a negative semantic check does not include a target fragment. Rather than generate a target fragment when a negative semantic check is matched in a source model, transformation engine 124 may halt transformation and provide an error message to the user. The user can then make the necessary changes to the source model to eliminate the semantically invalid pattern from the source model, and begin method 700 over again. In some embodiments, transformation engine 124 may take a source model as an input and simply apply semantic checks to the source model to verify the model's consistency with semantic requirements. Transformation engine 124 need not transform a source model in order to apply the semantic checks.

It is also possible to define positive semantic checks. For example, a series of positive semantic checks can be defined using model creation software 112. Transformation engine 124 can implement positive semantic checks at step S705 as well. If a particular source fragment of an input source model does not match at least one of the positive semantic checks, transformation engine 124 will halt transformation, so that the user can correct the source model to replace the invalid source fragment with a semantically valid fragment. In other embodiments, transformation engine 124 will continue the transformation. In both cases, transformation engine 124 may log some messages or warnings to indicate to the user that the semantic checks have failed.

As discussed above, method 700 creates the necessary objects and connections to convert a model in one notation to a new target model in another notation. Also as discussed, the name attribute of each symbol in a source model can be mapped by default to a name attribute of each symbol in the new target model. However, in some instances it will be useful to provide users with the opportunity to define their own mappings of attributes from objects in a source model to attributes of objects in a target model.

Figure 14:
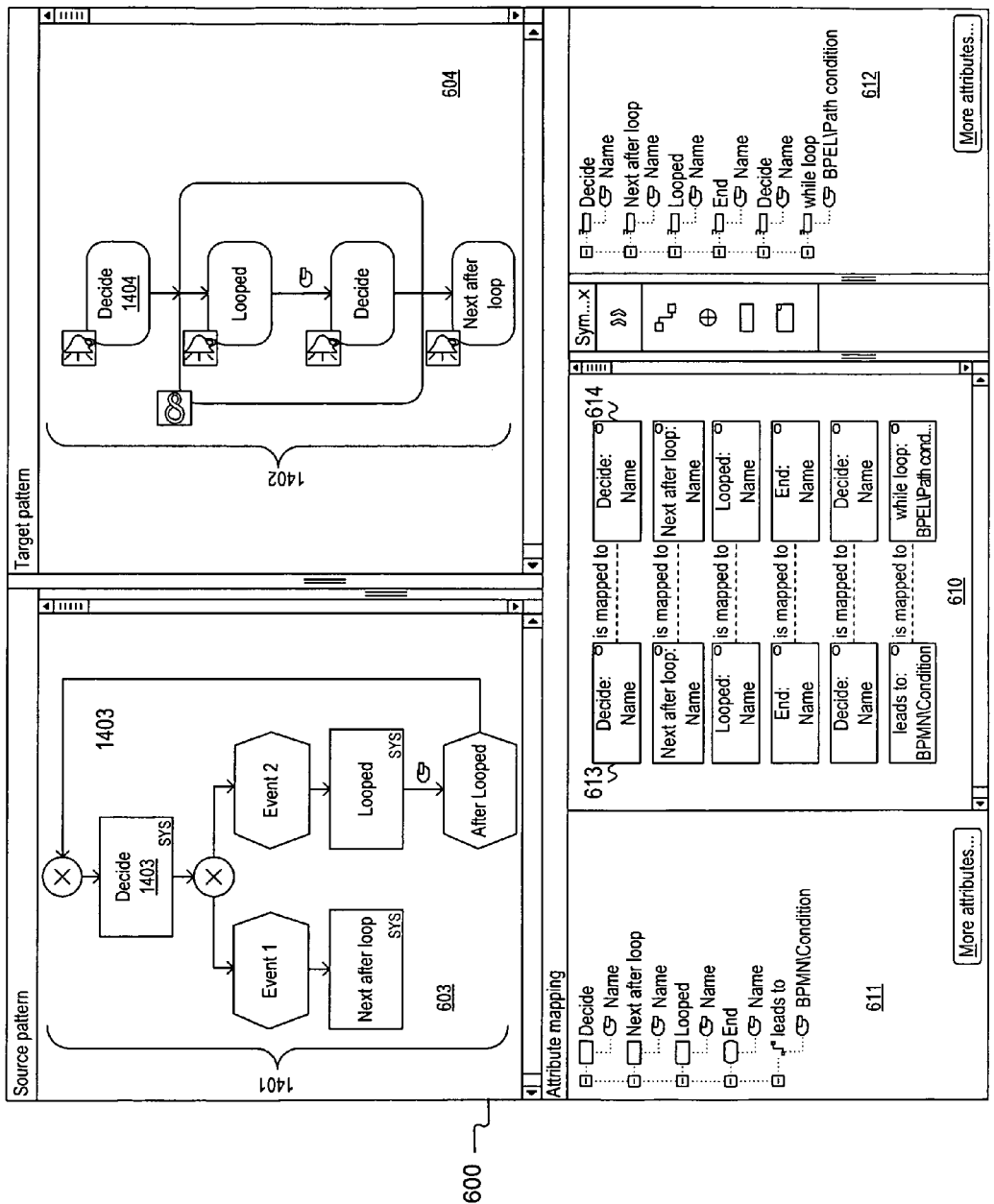
FIG. 14 illustrates an exemplary graphical user interface for developing transformation rules, consistent with an embodiment of the invention.

FIG. 14 illustrates an example of attribute mapping from source pattern 1401 in EPC notation to target pattern 1402 in ARIS BPEL notation. Source pattern 1401 has been created in source pattern area 603 of pattern designer window 600, and target pattern 1402 has been created in target pattern area 604. Using attribute mapping area 610, a user can manually define attribute mappings between objects in source pattern 603 to objects in target pattern 604.

Source object attribute area 611 provides a list of the objects in source pattern 603. The user can click on or otherwise select each object to expand the object and see a list of attributes. Similarly, target object attribute area 612 allows the user to expand the objects in target pattern 604 to view their attributes. The user can then click and drag an attribute, such as the name attribute 613 of EPC decide event 1403, into attribute mapping area 610. Similarly, the user can click and drag name attribute 614 of ARIS BPEL decide invoke 1404. The user can then use the mouse or another input device to connect these two attributes in attribute mapping window 610. Operators may also be used to for mappings, for example by concatenating multiple source object attributes to a single target object attribute. In addition to object attributes, model attributes and connection attributes can be mapped as well.

Attribute mappings defined in attribute mapping area 610 may be applied by transformation engine 124, consistent with method 700. In the example shown in FIG. 14, if a source model input to transformation engine 124 has a match for source pattern 1403, transformation engine 124 will create an object represented by a BPEL decide invoke symbol 301. The object will take its name attribute from the corresponding EPC decide function in the source model. In this way, users can flexibly define which attributes in a source model should be carried over to a newly created target model by transformation engine 124.

In addition to allowing a user to manually define attribute mappings, it can also be useful to provide users with the ability to define conditions on an object. In such a case, transformation engine 124 will evaluate the conditions to determine whether a given source model contains a matching fragment. Thus, these conditions allow a user to define source patterns that match based not just on the symbols and connections in a source model, but also based on the characteristics of underlying objects, models, or connections.

Figure 9:
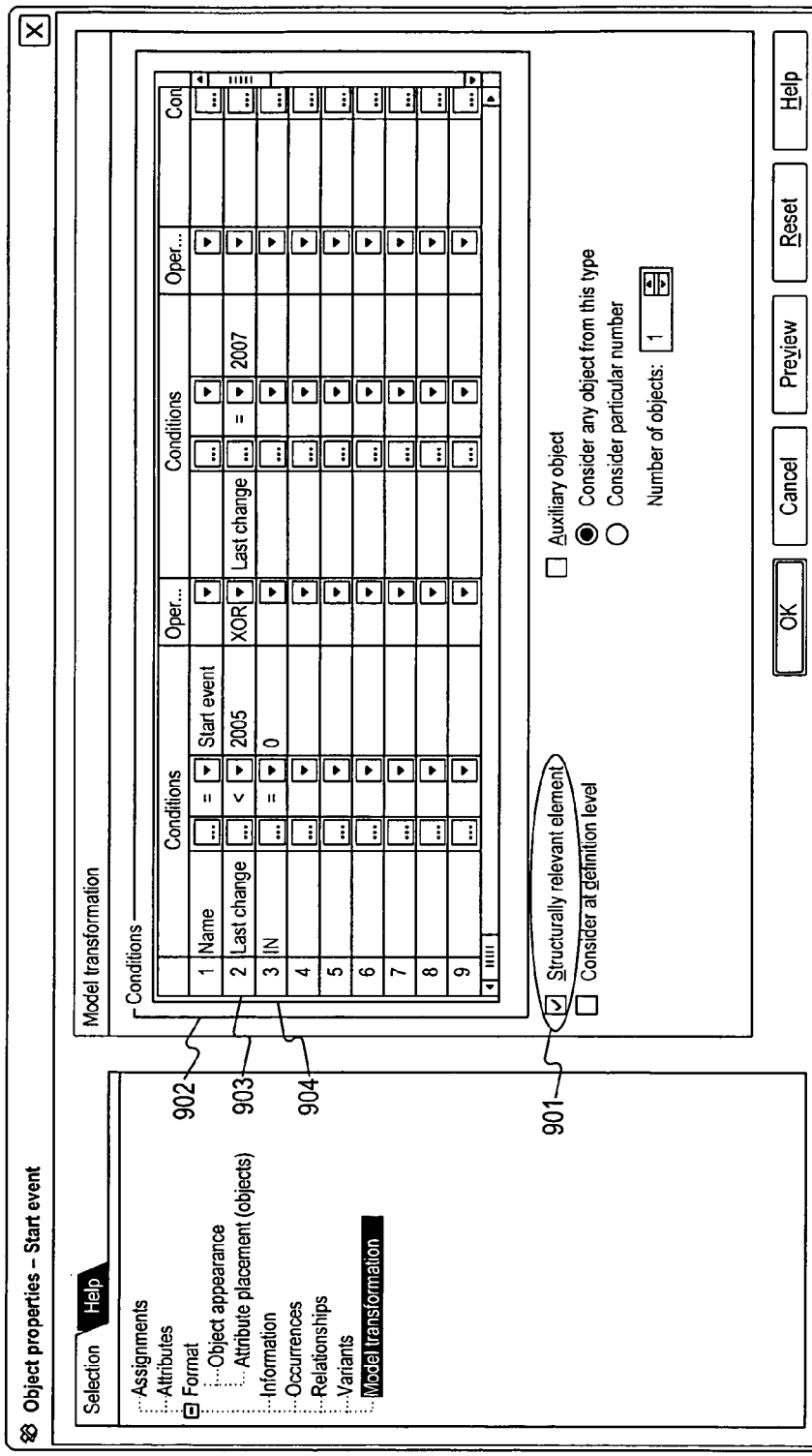
FIG. 9 illustrates an exemplary graphical user interface for viewing and setting object properties, consistent with an embodiment of the invention.

As shown in the example of FIG. 9, object properties window 900 may allow a user to define these attribute conditions. When defining a source pattern in source pattern area 603, a user can click on any object to view a corresponding object properties window 900. The user can then define attribute conditions for the source pattern. For example, object properties window 900 may be opened by a user who clicks on the start event object in source model 1000 of FIG. 10.

In accordance with one embodiment, object properties window 900 contains three conditions on an EPC start event object. Each condition includes an attribute, an operator, and an attribute value. For example, condition 1 902 requires that the object will only match if the name attribute of the corresponding event in a source pattern is a start event. Thus, when model transformation engine 124 implements method 700 to evaluate an input source model, only those EPC events in the source model that are named "start event" will be considered.

Condition 2 903 requires that the last change to an object has occurred either before 2005 or in 2007. Thus, an input source model will be evaluated for start events that were last modified either before 2005 or in 2007. Finally, condition 3 904 requires that the "IN" attribute, e.g., the number of incoming connections, must be equal to 0. Thus, a parsed input source model will be evaluated for start events with 0 incoming connections, where the most recent change to the corresponding object was either before 2005, or in 2007. As shown in FIG. 9, the columns in object properties window 900 may be concatenated with operators such as >=, <=, OR, AND, and ≠.

If all of the constraints are met and the rest of the source pattern matches a fragment of a source model, transformation engine 124 will note a match and create a corresponding target fragment. However, if any of these 3 conditions is not met, no match will be processed even though the source model may contain a fragment with the appropriate object types and relationships. The rows in object properties window 900 may be considered to be logically connected with an "AND" operator, e.g. each row must be satisfied in order to create a match.

In the exemplary method 700 discussed above, a new target model was created from an input source model. However, there may be times when a user wishes to make a change to an existing target model without having to completely regenerate the target model. For example, an old source model might have been used to generate a target model. Then, the user might make some changes to the source model that they would like to see reflected in the target model. Rather than regenerate an entire new target model, it can be useful to propagate changes from the modified source model to update the existing target model.

Figure 15:
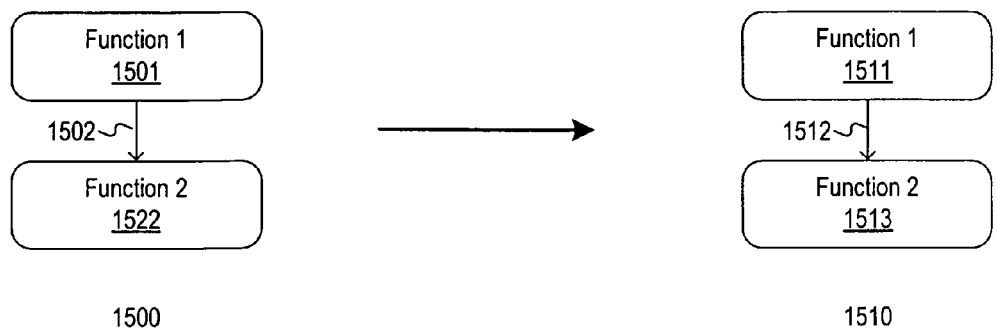
FIG. 15 an exemplary update of an existing target model based on an update to a corresponding existing source model, consistent with an embodiment of the invention.
Figure 15:
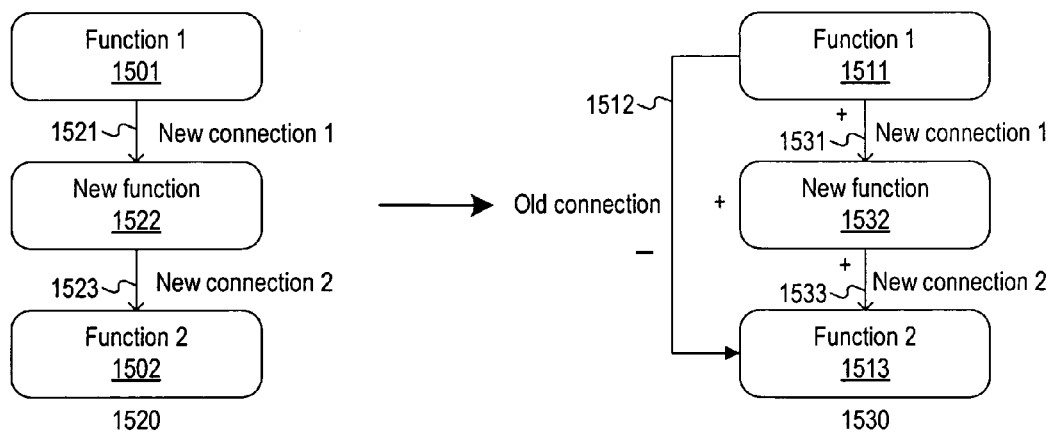

FIG. 15 illustrates an exemplary embodiment, consistent with an aspect of the invention, with an original source model 1500 in EPC notation, and an original target model 1510 in BPMN notation. Target model 1510 may have been generated from original source model 1500 using method 700, as discussed above. Now assume a user makes some changes to original source model 1500, to create updated source model 1520. As shown, the user has added new connection 1 1521, new function 1522, and new connection 2 1523 to original source model 1500, while deleting connection 1502, to create updated source model 1520 in EPC notation.

Using a node analysis, transformation engine 124 will merge these changes into original target model 1510 to create updated target model 1530 in BPMN notation. As shown, updated target model 1530 includes original function 1 1511 and original function 2 1513. However, connection 1512 has been deleted, as indicated by minus symbols in updated target model 1530. In the place of connection 1512, as indicated by plus symbols, are three new symbols: new connection 1 1531, new function activity 1532, and new connection 2 1533. New connection 1 1531, new function 1532, and new connection 2 1533 correspond to the newly added symbols to updated source model 1520, e.g., new connection 1 1521, new function 1522, and new connection 2 1523, respectively. In this manner, transformation engine 124 can thus update an existing target model to reflect changes in an updated source model without having to regenerate the full model.

In some instances, a user will also desire to propagate the attributes of changed source model attributes over to the updated target model. For example, function 1 1501 and function 2 1502 of original source model may have several attributes that are modified by the user when creating updated source model 1520. When updating original target model 1510 to reflect the new symbols in updated source model 1520, it may be desirable to also update original target model 1510 to reflect the modified attributes. On the other hand, the user may wish to update target model 1510 to reflect the added symbols to updated source model 1520, but may wish to preserve the attributes of the existing target model.

Thus, a user can be presented with an option to select either "source overwrites target" or "target preserved." If the user selects "source overwrites target," then all of the attributes of objects in the source model will be applied to the corresponding target model objects. Thus, all of the attributes from function 1 1501 in updated source model 1520 would be applied to function 1 activity 1511 in updated target model 1530. Similarly, all of the attributes from function 2 1502 in updated source model 1520 would be applied to function 2 activity 1513 in updated target model 1530.

On the other hand, if the user selects "target preserved," the update to target model 1510 will preserve the attributes of function 1 activity 1511 and function 2 activity 1513. This allows the user to incorporate structural changes from updated model 1520, e.g. new connection 1 1531, new function activity 1532, and new connection 2 1533, from updated source model 1520 without changing the attributes of existing objects function 1 activity 1511 and function 2 activity 1513.

Figure 16:
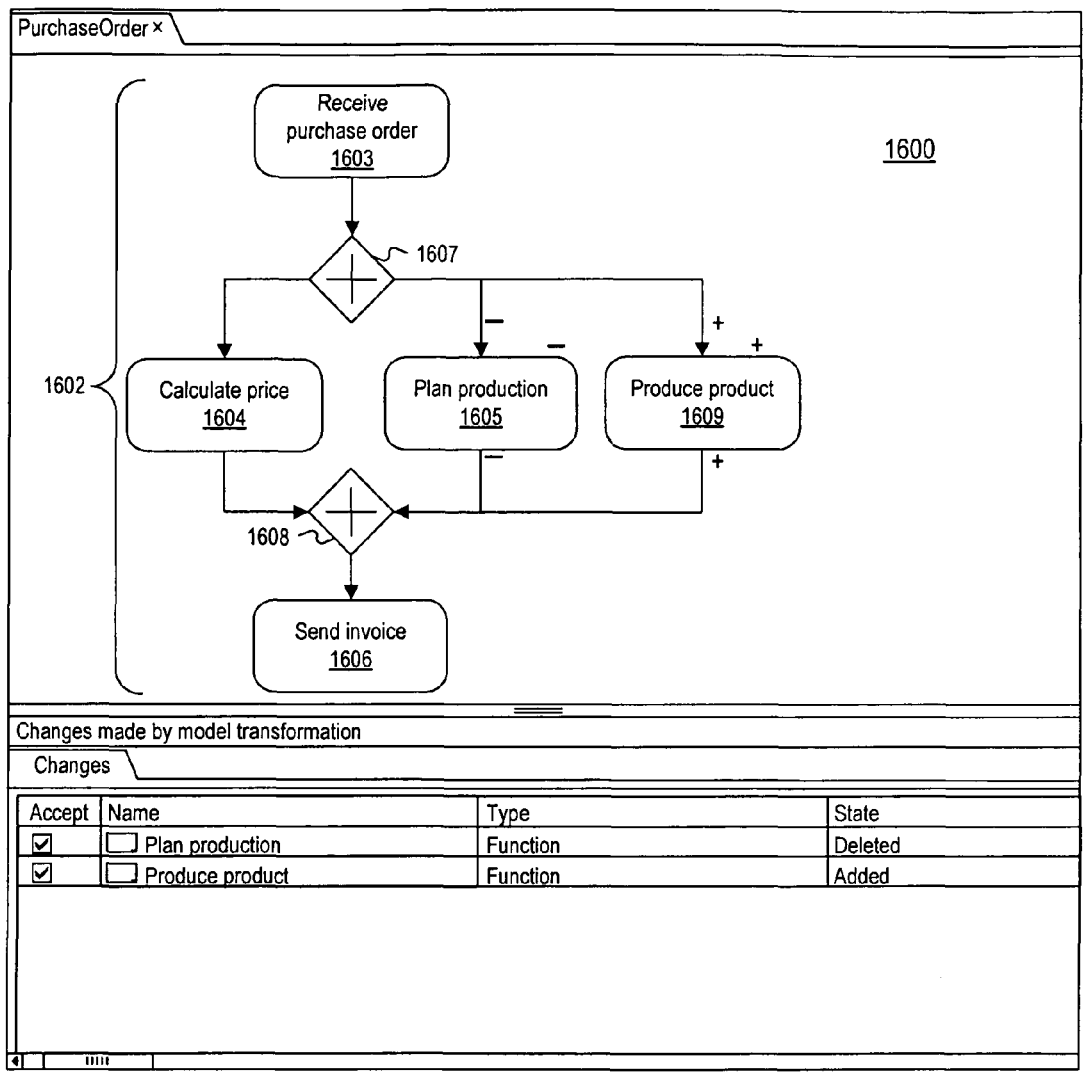
FIG. 16 illustrates an exemplary graphical user interface for interactively merging changes into a model based on graphically developed transformation rules, consistent with an embodiment of the invention.

As discussed above, transformation engine 124 can apply changes to a source model to an existing target model. However, in some instances it may be useful to allow a user to review each change before actually making any changes to the target model. FIG. 16 illustrates an exemplary interactive merge window 1600. Using interactive merge window 1600, the user can review each change to an existing target model before transformation engine 124 actually modifies the target model.

FIG. 16 illustrates a situation where an existing BPMN target model 1602 includes receive purchase order activity 1603, calculate price activity 1604, plan production activity 1605, and send invoice activity 1606. The user has made some changes to a corresponding EPC source model (not shown) that will cause transformation engine 124 to replace plan production activity 1605 with produce product activity 1609. Interactive merge window 1600 allows the user to review these changes before transformation engine 124 updates BPMN target model 1602. If the user accepts the changes, plan production symbol 1605 will be deleted, and produce product symbol 1609 will be added, to BPMN target model 1602. Otherwise, the user can decline the changes by not clicking accept, and transformation engine 124 will not make the unaccepted changes to BPMN target model 1602.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computerized method for graphically developing at least one transformation rule for transforming a source description notation into a target description notation, the method comprising the following operations performed by one or more processors:
    providing a source group of graphical constructs in a database, the source group of graphical constructs including symbols available in the source description notation;
    providing a target group of graphical constructs in the database, the target group of graphical constructs including symbols available in the target description notation;
    providing a source pattern area for a user to construct a source pattern in the source description notation using the source group of graphical constructs;
    providing a target pattern area, separate from the source pattern area, for a user to construct a corresponding target pattern in the target description notation using the target group graphical constructs;
    arranging, based on user input, the source graphical constructs in the source pattern area according to user instructions to construct the source pattern;
    arranging, based on user input, the target graphical constructs in the target pattern area according to user instructions to construct the corresponding target pattern; and
    sending the source pattern and the corresponding target pattern to a transformation engine, whereby the transformation engine stores the source pattern and the corresponding target pattern as a transformation rule and subsequently uses the transformation rule to transform a source model in the source description notation into a target model in the target description notation, the transformation rule specifying how to convert at least one source graphical construct contained in the source pattern into at least one target graphical construct contained in the target pattern.

2. The method according to claim 1, further comprising repeating the method to generate a plurality of transformation rules based on user input.

3. The method according to claim 1, wherein the source description notation is EPC notation and the target description notation is BPMN notation or ARIS BPEL notation.

4. The method according to claim 2, further comprising sending a request to the transformation engine to transform the source model, whereby the transformation engine returns the target model in response to the request.

5. A computerized method, comprising the following operations performed by one or more processors:
    receiving, from a source pattern area, a graphical source model represented in a source description language, the source model comprising a plurality of source fragments;
    retrieving a source pattern represented in the source description language;
    retrieving a target pattern represented in a target description language;
    retrieving a transformation rule that specifies how to convert the source pattern to the target pattern;
    identifying a graphical source fragment among the plurality of source fragments in the source model that matches the source pattern;
    generating a target model fragment in the target description language from the identified source fragment based on the transformation rule for display in an area separate from the source pattern area;
    generating a second target model fragment in the target description language; and
    completing a target model by creating a default connection between a structurally relevant object in the target model fragment and a structurally relevant object in the second target model fragment.

6. The method according to claim 5, further comprising:
    retrieving a second source pattern, a second target pattern, and a second transformation rule that specifies how to convert the second source pattern to the second target pattern;
    identifying a second source fragment among the plurality of source fragments in the source model that matches the second source pattern; and
    wherein generating the second target model fragment comprises generating the second target model fragment in the target description language from the identified second source fragment based on the second transformation rule.

7. The method according to claim 6, wherein the structurally relevant objects are defined as structurally relevant by a user using a graphical user interface.

8. The method according to claim 6, further comprising:
    receiving changes to the source model; and
    automatically propagating the changes to the completed target model by modifying a subset of the target model corresponding to the changes to the source model.

9. The method according to claim 6, further comprising:
    receiving changes to the source model; and
    presenting a user with an interactive merge interface illustrating corresponding changes to the target model.

10. The method according to claim 9, further comprising:
    receiving instructions from the user to accept or reject the corresponding changes to the target model.

11. The method according to claim 5, further comprising:
    retrieving an attribute condition for an object in the source pattern;
    wherein identifying the matching source fragment in the source model includes verifying that a corresponding object in the source model meets the attribute condition.

12. The method according to claim 6,
wherein the source model includes an object with an assigned submodel, and wherein the method further comprises:
providing a user with a selectable option to determine whether the assigned submodel should be evaluated for matches with the source pattern.

13. The method according to claim 5, further comprising:
providing the user with a selectable option to either:
generate a distinct target model for the assigned submodel; or
generate a single target model representing both the source model and the assigned submodel.

14. The method according to claim 5, further comprising:
receiving a negative semantic check pattern represented in the source description language; and
verifying that no source fragments in the source model include the negative semantic check pattern.

15. The method according to claim 5, further comprising:
receiving a plurality of positive semantic check patterns represented in the source description language; and
verifying that source fragments in the source model match at least one of the plurality of positive semantic check patterns.

16. A non-transitory computer readable medium comprising instructions for causing one or more processors to execute a method for graphically developing at least one transformation rule for transforming a source description notation into a target description notation, the method comprising:
providing a source group of graphical constructs in a database, the source group of graphical constructs including symbols available in the source description notation;
providing a target group of graphical constructs in the database, the target group of graphical constructs including symbols available in the target description notation;
providing a source pattern area for a user to construct a source pattern in the source description notation using the source group of graphical constructs;
providing a target pattern area, separate from the source pattern area, for a user to construct a corresponding target pattern in the target description notation using the target group graphical constructs;
arranging, based on user input, the source graphical constructs in the source pattern area according to user instructions to construct the source pattern;
arranging, based on user input, the target graphical constructs in the target pattern area according to user instructions to construct the corresponding target pattern; and
sending the source pattern and the corresponding target pattern to a transformation engine, whereby the transformation engine stores the source pattern and the corresponding target pattern as a transformation rule and subsequently uses the transformation rule to transform a source model in the source description notation into a target model in the target description notation, the transformation rule specifying how to convert at least one source graphical construct contained in the source pattern into at least one target graphical construct contained in the target pattern.

17. A non-transitory computer readable medium comprising instructions for causing one or more processors to execute a method, the method comprising:
receiving, from a source pattern area, a graphical source model represented in a source description language, the source model comprising a plurality of source fragments;
retrieving a source pattern represented in the source description language;
retrieving a target pattern represented in a target description language;
retrieving a transformation rule that specifies how to convert the source pattern to the target pattern;
identifying a graphical source fragment among the plurality of source fragments in the source model that matches the source pattern;
generating a target model fragment in the target description language from the identified source fragment based on the transformation rule for display in an area separate from the source pattern area;
generating a second target model fragment in the target description language; and
completing a target model by creating a default connection between a structurally relevant object in the target model fragment and a structurally relevant object in the second target model fragment.

18. An apparatus for enabling a user to graphically develop at least one transformation rule for transforming a model in a source description notation into a new model in a target description notation, the apparatus comprising:
at least one processor; and
model creation software that executes the following steps on the at least one processor:
providing a source group of graphical constructs in a database, the source group of graphical constructs including symbols available in the source description notation;
providing a target group of graphical constructs in the database, the target group of graphical constructs including symbols available in the target description notation;
providing a source pattern area for a user to construct a source pattern in the source description notation using the source group of graphical constructs;
providing a target pattern area, separate from the source pattern area, for a user to construct a target pattern in the target description notation using the target group graphical constructs;
arranging, based on user input, the source graphical constructs in the source pattern area according to user instructions to construct the source pattern;
arranging, based on user input, the target graphical constructs in the target pattern area according to user instructions to construct the target pattern;
sending the source pattern and the target pattern to a transformation engine; and
accessing at least one transformation rule provided by the transformation engine, the at least one transformation rule specifying how to convert at least one source graphical construct contained in the source pattern into at least one target graphical construct contained in the target pattern.

19. An apparatus comprising:
at least one processor; and
a transformation engine that executes the following steps on the at least one processor:
receiving, from a source pattern area, a graphical source model represented in a source description language, the source model comprising a plurality of source fragments;
retrieving a source pattern represented in the source description language;
retrieving a target pattern represented in a target description language;

retrieving a transformation rule that specifies how to convert the source pattern to the target pattern;

identifying a graphical source fragment among the plurality of source fragments in the source model that matches the source pattern;

generating a target model fragment in the target description language from the identified source fragment based on the transformation rule for display in an area separate from the source pattern area;

generating a second target model fragment in the target description language; and completing a target model by creating a default connection between a structurally relevant object in the target model fragment and a structurally relevant object in the second target model fragment.

20. The computer readable medium according to claim 17, wherein the structurally relevant objects are defined as structurally relevant by a user using a graphical user interface.

21. The apparatus according to claim 19, wherein the structurally relevant objects are defined as structurally relevant by a user using a graphical user interface.

* * * * *